United States Patent [19]

Bar-Yam

[11] Patent Number: 5,687,286
[45] Date of Patent: Nov. 11, 1997

[54] NEURAL NETWORKS WITH SUBDIVISION

[76] Inventor: Yaneer Bar-Yam, 46 Blake St., Newton, Mass. 02160

[21] Appl. No.: 422,437

[22] Filed: Apr. 14, 1995

Related U.S. Application Data

[63] Continuation of Ser. No. 970,144, Nov. 2, 1992, abandoned.
[51] Int. Cl.$^6$ ............................................. G10L 5/06
[52] U.S. Cl. ................ 395/2.41; 395/2.11; 395/2.4; 395/2.67; 395/2.68; 395/21; 395/23; 395/24
[58] Field of Search ................. 395/2, 2.1, 2.11, 395/2.4, 2.41, 2.67, 2.68, 21, 23–27

[56] References Cited

U.S. PATENT DOCUMENTS

| | | | |
|---|---|---|---|
| 4,874,963 | 10/1989 | Aispector | 307/201 |
| 5,212,730 | 5/1993 | Wileatley et al. | 381/43 |
| 5,253,328 | 10/1993 | Hartman | 395/24 |
| 5,285,522 | 2/1994 | Mueller | 395/2.41 |
| 5,303,328 | 4/1994 | Masui et al. | 395/23 |

OTHER PUBLICATIONS

G. Yen et al., "Unlearning Algorithm in Associative Memories: The Eigenstructure Method," IEEE Int'l Symp. on Circuits and Systems, May 10–13, 1992, pp. 355–358.

G. Yen et al., "A Learning and Forgetting Algorithm in Associative Memories: The Eigenstructure Method," IEEE Trans. on Circuits and Systems, 39(4):212–25, Apr. 1992.

G. Yen et al., "A Learning and Forgetting Algorithm in Associative Memories: The Eigenstructure Method," Conf. on Control and Decision, Dec. 11–13, 1991, pp. 847–852.

A. Michel et al., :"Analysis and Synthesis of a Class of Discrete-Time Neural Networks Described on Hypercubes," IEEE Trans. on Neural Networks, 2(1):32–46, Jan. 1991.

C. Youn et al., "Continuous Unlearning in Neural Networks," Electronics Letters, 25(3):202–03, Feb. 2, 1989.

J. Bridle, "Speech Recognition: Statistical and Neural Information Processing Approaches," D. Touretzky, ed., Advances in Neural Information Processing I, pp. 796–801, 1989.

M. Fanty et al., "Spoken Letter Recognition," R. Lippmann et al., eds., Advances in Neural Information Processing Systems 3, pp. 220–226, 1991.

"Retrieval Properties of Neural Networks with Hierarchical Clustering":, M.A. Pires Idiart et al., J. Phys. A: Math. Gen. 24, L649–L658 (1991).

"Exponential Storage and Retrieval in Hierachical Neural Networks", C. Willcox, J., Phys. A: Math. Gen 22, 4707–4728 (1989).

(List continued on next page.)

*Primary Examiner*—Allen R. MacDonald
*Assistant Examiner*—Alphonso A. Collins
*Attorney, Agent, or Firm*—Choate, Hall & Stewart

[57] ABSTRACT

A neural network apparatus, and methods for training the neural network apparatus, for processing input information, supplied as a data array, for a prespecified application to indicate output categories characteristic of the processing for that application. In the invention, an input stage accepts the data array and converts it to a corresponding internal representation, and a data preprocessor analyzes the data array based on a plurality of feature attributes to generate a corresponding plurality of attribute measures. A neural network, comprising a plurality of interconnected neurons, processes the attribute measures to reach a neural state representative of corresponding category attributes; portions of the network are predefined to include a number of neurons and prespecified with a particular correspondence to the feature attributes to accept corresponding attribute measures for the data array, and portions of the network are prespecified with a particular correspondence to the category attributes. A data postprocessor indicates the category attributes by correlating the neural state with predefined category attribute measures, and an output stage combines the category measures in a prespecified manner to generate on output category for the input information.

34 Claims, 15 Drawing Sheets

OTHER PUBLICATIONS

"The Functional Logic of Cortical Connections", S. Zeki et al., Nature 355(22), 311–317 (Sep. 1988).

"Hierarchical Model of Memory and Memory Loss", J.P. Sutton et al., J. Phys. A: Math. Gen. 21, 4443–4454 (1988).

"A Coded Block Adaptive Neural Network System with a Radical–Partitioned Structure for Large–Volume Chinese Characters Recognition,", M.W. Mao et al., Neural Networks 5(5), 835–841 (Sep. 1992).

"Solving the Interconnection Problem with a Linked Assembly of Neural Networks", A.D.P. Green et al., IEEE Proceedings–F 138(1), 63–72 (Feb. 1991).

"Multiscale Optimization in Neural Nets", E. Mjolsness et al., IEEE Trans. on Neural Networks 2(2), 263–274 (Mar. 1991).

"Hierarchical Neural Networks for the Storage of Correlated Memories", V. Deshpande et al., J. Statistical Phys. 64(3/4), 755–779 (1991).

"Ordered' Spin Glass: A Hierarchical Memory Machine", V.S. Dotsenko, J. Phys. C: Solid State Phys. 18, L1017–L1022 (1985).

"Adaptive Mixtures of Local Experts", R.A. Jacobs et al., Neural Computation 3, 79–87 (1991).

"Ising Spin Neural Networks with Spatial Structure", A.C.C.. Coolen, North–Holland Future Generations Computer System 6, 121–130 (1990).

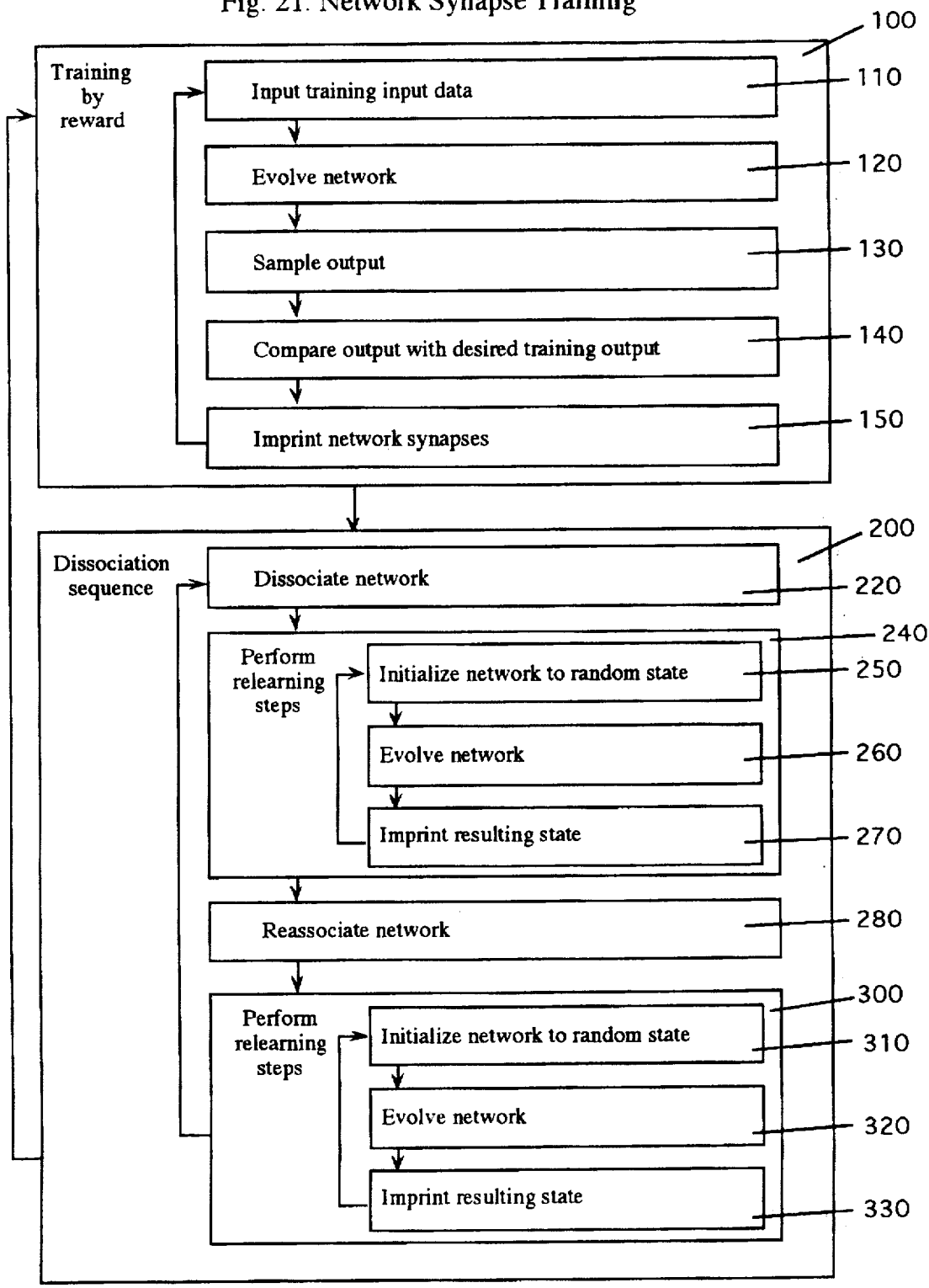
Fig. 21: Network Synapse Training

NEURAL NETWORKS WITH SUBDIVISION This application is a continuation of Ser. No. 970,144 filed Nov. 2, 1992 now abandoned.

This invention relates to neural network design and training techniques.

BACKGROUND

In recent years there have been several approaches to artificial intelligence and artificial intelligence tasks. A central application of artificial intelligence is the problem of pattern recognition. Pattern recognition in a broad sense is the description of information fields (such as visual or audio information) in terms of objects or elements; or the classification of such information fields.

One of the approaches to this problem is the area of programmed logic which is the domain of formal artificial intelligence. In this approach programs attempt to recover human logic by directly representing programmer understanding of how these tasks are being performed in the human brain. A quite different approach has been pursued through the field of perceptron or artificial neural networks. In such networks implemented in computer hardware or by software simulation, the operation of the neurons and some aspects of functioning of the mind such as associative memory can be described. This approach does not require a direct understanding of the task to be performed, the general category of tasks is sufficient. The network is "self-organizing" so that a simple learning rule is used to teach the network information. The network can then perform simple information processing tasks. These tasks depend on the design of the network and on the information presented. Typically, networks can work as associative memories, content addressable memories and simple expert systems. In essence, these functions are possible because of the network ability to recall the learned information and to perform a simple type of generalization of the information where similar information is treated similarly. "Similar" here has a strict and limited meaning in terms of the inner product of the imprinted information. These applications have found a variety of practical uses.

The architecture of these artificial neural networks is based on modeling of the human brain. In the conventional neural network model of the human brain, the brain is assumed to be composed of neurons which can be in an excited or passive state. Neurons affect the activity of other neurons through synaptic connections. The state of the mind is described by the activity pattern of the neurons, which evolves dynamically through the mutual influence of the neurons as mediated by the synapses. During "waking hours", sensory information partially determines the state of neuron excitations. Actions are the result of motor neuron activity and, therefore, also reflect the state of neuron excitation in the brain. A substantial pan of synaptic connections are "hard-wired" performing functions which are pre-specified. However, synaptic strengths are also affected by the state of neuronal excitation. This constitutes a basic step in learning called imprinting.

The artificial neural network consists of a set of variables called neurons which represent the neuron activity (firing or quiescence), and a set of variables called synapses which represent the strength of mutual influence of the neuron firings. A neuron dynamics results from the influence of neurons on each other through the synapses and the imposition of information from an external source. The synapses change their values by an imprinting process which changes the synapse values using the state of the neurons, and the previous state of the synapses. An imprinted pattern of excitations can be recovered if part of the pattern is allowed to evolve by the synapse driven dynamics. This property can be used to describe associative memory properties of information processing. Neural network information processing generally consists of a training stage and an operating stage where the network serves as an associative memory, recalling the imprinted information.

There has been however, very little progress in generalizing the process of neural network activity to represent the object-oriented logic of human information processing and higher human information processing capabilities. This means that there is currently no architecture which is able to learn such processing tasks by a simple rule so that the main approach taken currently is for an individual to encode the process directly by logical programming.

An existing approach to construction of artificial neural networks for complex pattern recognition tasks may be referred to. In this existing approach, the task is subdivided. Separate networks are trained to perform preliminary functions, then additional tasks are trained using output information from previously trained networks. This process requires that an individual who is training the networks decide on the training of each of the networks. Thus, for example, in applications to speech recognition, a first set of networks performs prespecified feature detection on the incoming sound, then additional networks may be trained to identify phonemes.

An additional existing approach to training neural networks to avoid exceeding storage capacity consists of a variety of procedures by which the ability to recall older imprints is reduced in comparison to newer imprints. Networks with such training procedures are termed palimpsest memories. Geszti and Pázmándi in "Learning within bounds and dream sleep" have discussed a particular relearning procedure within the context of a palimpsest memory designed by Parisi.

There are two classes of neural networks, feed forward and attractor networks. Feed forward networks consider an input-output system of neurons with directed synapses and are most often trained by back propagation of error correction to provide specified output for input information. In attractor networks synapses are symmetric so that the influence of one neuron on another is mirrored in the influence of the second on the first. Training is by Hebbian or modified Hebbian imprinting where the memories are imposed upon the network and the synapse values are modified to enable the memory recall. Recall is performed by imposing on the network a part of an imprinted pattern and the remainder of the pattern is recovered using the neural dynamics to evolve to a stable state (attractor). The memory capacity of a neural network is limited, and upon learning beyond the capacity of the network overload breakdown occurs. This is particularly important for information which is correlated. Aside from the two major classes of networks, other neural network architectures have been developed and implemented. A wide variety of theoretical studies and applications of neural networks may be found in the literature.

SUMMARY OF THE INVENTION

In one aspect, the invention provides a neural network apparatus for processing input information, supplied as a data array, for a prespecified application to indicate output categories characteristic of the processing for that application. In the invention, an input stage accepts the data array and converts it to a corresponding internal representation, and a data preprocessor analyzes the data array based on a plurality of feature attributes to generate a corresponding plurality of attribute measures. A neural network, comprising a plurality of interconnected neurons, processes the attribute measures to reach a neural state representative of corresponding category attributes; portions of the network are predefined to include a number of neurons and prespecified with a particular correspondence to the feature attributes to accept corresponding attribute measures for the data array, and portions of the network are prespecified with a particular correspondence to the category attributes. A data postprocessor indicates the category attributes by correlating the neural state with predefined category attribute measures, and an output stage combines the category measures in a prespecified manner to generate on output category for the input information.

In another aspect, the invention provides a method of trig a neural network which has reached a predefined capacity for information storage so that more information may be imprinted on the network. In the invention, a dissociation sequence is performed, in which first the neural network synapse interconnection weights are decreased by a first factor to dissociate the network, and then a first relearning sequence if performed, comprising initiating the network to a random state, evolving the network to a resulting neural state based on a prespecified update rule at a first preselected finite temperature below a point of stability, and then imprinting interconnection weights corresponding to the neural state. The interconnection weights of the neural network are then increased by a second prespecified factor to reassociate the network, and then a second relearning sequence is performed, comprising initiating the network to a random state, evolving the network to a resulting neural state based on a prespecified update rule at a second preselected finite temperature below a point of stability, and then imprinting the interconnections with interconnection weights corresponding to the resulting neural state, whereby further information may be imprinted on the network.

BRIEF DESCRIPTION OF THE DRAWINGS

FIG. 21 is a flow chart of the network synapse training sequence provided by one embodiment of the invention.

DESCRIPTION OF PREFERRED EMBODIMENT

Figure 1:
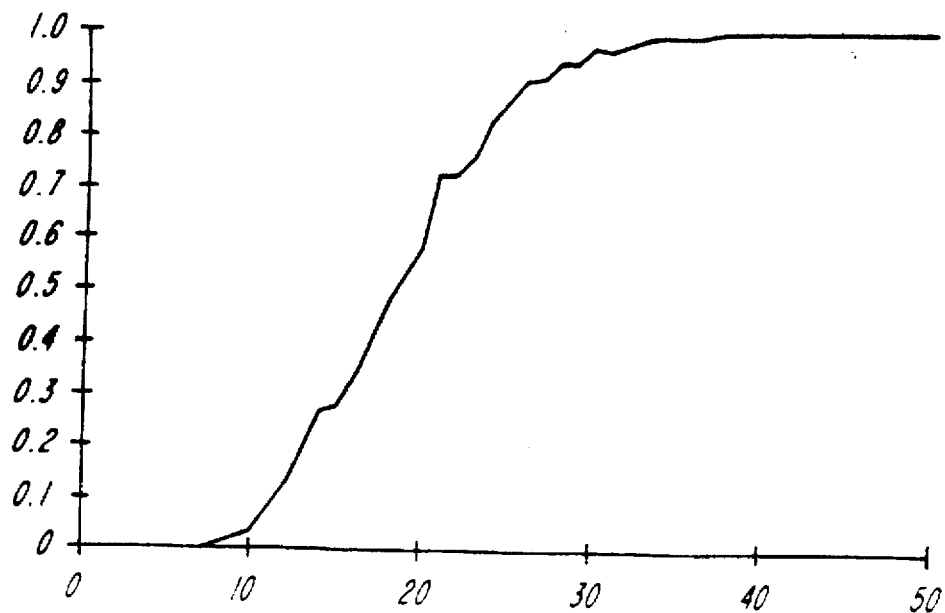
FIG. 1 is a plot of recall-error-fraction, as a function of p the number-of-imprinted-neural-states for a neural network with N=100 neurons.

Sensory input, such as the visual field, consists of an array of data which can be considered without seam or subdivision. In contrast, we perceive the world around us as composed of objects or aspects which can be differentiated one from the other. The ability to differentiate objects within a visual field is considered to be a basic problem in artificial intelligence. However, the human mind goes far beyond the identification of objects in the visual field. It is able to identify objects or aspects in abstract constructions which might be considered as far removed from the concrete objects of our sensory field.

Identification of an object in the visual field is in itself an important abstraction from the image. The abstraction says something about the existence of the object apart from its current position, orientation or function. It speaks as to its indivisibility or its distinctness from the other objects around it. Somewhat more specifically that the "same" (read similar) thing can be found in other visual fields.

There can be a debate as to whether the world is indeed composed of objects or whether our perception makes it so. Let us assume that this the subdivision is actually correct in a sense which is about to be discussed. Then, the number of possible fields of vision is vastly greater than the number of objects in the world. Even for a few objects the number of possible ways to arrange them is great. We could use this as a definition of what we mean by that the world is made up out of objects. This then suggests the benefit of human response to the world through identifying objects and their interrelationships rather than developing programmed response to the visual field itself. In essence the learning of response to objects and their relationships provides a greater ability for generalization from prior learned experience.

In developing a model of the information processing of the human mind, some criteria must be established by which the model's success is measured. In conventional neural network models the primary measure is the amount of information which can be stored / remembered. This criteria will play an important role in the model to be developed here, since it will be shown that for a world in which objects and patterns exist, the storage capacity of the architecture which will be developed is much greater than that of the conventional architecture. The point can already be made through the notion of data compression. It we are interested only in identifying the sequence of letters on this page, we can store this information in much less room than the visual imprint of this page. Architectural design which enables storage of letters rather than images is therefore a large advantage over a visual map storage system.

The basic neural network model is based on a network architecture which is built out of neurons which can have the two possible states ON or OFF, loosely corresponding to a firing or quiescent neuron. The state of the neural network is the state of all the neurons. Information is stored not in the state of the network but the state of the connections between the neurons which can be modified in the learning process. Very short term memory is stored in the state of the network when the network is used to process and store temporal sequence information. The connections influence the state of the network since one neuron influences the state of other neurons. The time dependence of the behavior of thought is essential to its description. However, in conventional models this time evolution is not considered crucial to understanding many principles of the operation of the network.

In the neural network model of the human mind, the basic learning process is an imprinting of information. Information is imposed as a state of the neural network, and the connections between neurons are modified so as to "remember" this information. The mechanism for retrieval is through imposing only part of the same image on the mind and then the internal connections of the neural network force the rest of the neurons to recreate the stored image.

In order to illustrate how this process works in terms of behavior, we have to consider the nervous system "output" leading to action as also pan of the state of the mind. Then we can consider the example of a child who learns to say the name "MA" whenever she sees her mother. Let us say that somehow (by smiling or shouting) we are able to trigger the imprinting. Then at some time, by pure coincidence, when seeing her mother she says something which sounds like MA (or even quite different at first, subject to later refinement) we encourage an imprint, and forever more she will say MA whenever she sees her mother. Of course this process could be enhanced by all kinds of additions, but this is one essential process for human learning and human functioning which the neural network captures well.

In a conventional neural network the visual field, and indeed all input is treated as a single entity. The essential quantity which characterizes a particular field is the overlap (or similarity) of the field with imprinted fields. This means, for example, that if we want the child to say "MA" no matter how her mother appears in the visual field, then all possible ways the Mother can appear in the visual field must be imprinted independently. By "all possible" is meant that essentially independent ways, ways for which the overlap of one with the other are small. This overlap is strictly a vector overlap. Since there are very many ways that the mother can appear in the visual field with only small overlap, this would require a large pan of the neural memory. The capacity of a neural network should be considered to be finite. The number of independent images which can be stored is linear in the number of neurons.

Another example in which the seamless field encounters difficulties is when two fields have a high overlap except for a small but crucial pan. The ability to differentiate response to these visual fields relies upon the influence of the neurons affected by the small set of different neurons. This is not treated well by this model.

There are special purpose ways to alleviate this problem in visual perception by techniques which are not only theoretically interesting but actually found in the visual processing system. While such special purpose processing can be useful, the general nature of the human mind suggests we consider a more widely applicable process to identification of objects. Objects need not only be visually distinct but, more generally, may be used to describe the wealth of abstractions which can be treated as "objects" by the mind.

For example a relationship like "brother" which can be present in many different circumstances.

In summary, because of the many different possible visual fields, it is impossible for the mind to be imprinted with all of the appropriate ones and associate them with the appropriate response. Instead, the visual fields are to be understood as described through different combinations of objects. In this invention, subdivided neural networks are designed to provide the treatment of information in terms of objects. A single data field is represented in the subdivided neural network by representing distinct objects (aspects, elements or features) in different subdivisions of the network. The use of the term "object" is here to be understood as self-defining as the information contained in a particular subnetwork and not necessarily to correspond to conventional definitions of objects. In particular, "object" may also refer to an elementary part of output (action), or an elementary part of a processing procedure.

Equally important to understanding the primary functioning of a neural network as an associative memory is an understanding of the primary mode of failure. In understanding the dynamics of neural network memories, there is a quickly understood failure upon overload of the memory. This failure results in indiscriminate erasure of memory and loss of associative functioning. This failure plays an important role in the understanding that will be developed for the brain functioning since many of the architectural aspects are designed to overcome this problem. The failure of a neural network occurs when the number of learned memories exceeds the memory capacity of the network. In such a case conventional network models undergo a catastrophic failure where essentially all memories become irretrievable.

The network failure should not be understood as an aberration distinct from the functioning of the network itself. Indeed this failure is an outgrowth of the nature of learning in the neural network model. In order to understand the way failure and learning are intimately related it is convenient to define a property which is related to the failure of the network, and is at the same time closely tied to learning, this is the concept of "locking". The idea of locking is that a network may evolve under learning so that several neurons become so intimately connected to each other that the number of stable states that these neurons may achieve is reduced from say $2^n$ to 2 (required in simple models by symmetry). This essentially locks these neurons to each other and reduces the effective dimensionality of the network space. Once this happens fewer memories can be stored. More generally, locking describes a dynamic phenomenon where the network state evolution becomes impaired similar to the dynamics of the 'spin-glass' state. It is important to note, however, that a certain degree of locking is precisely what learning achieves by limiting the number of stable patterns for firing of the whole neural network. It is the distinction between the reduction of stable patterns of the whole network and a few neurons of the network which is a difference between learning and locking. Locking emerges naturally in the process of learning correlated or random information through the gradual strengthening of particular connections. The process of locking and the accompanying catastrophe can thus be limited by limiting the magnitude of synaptic connections. However, within the context of the network developed below a different systematic approach is used which makes use of an additional learning step which appears to be analogous to the functioning of sleep.

In the context in which sleep plays a fundamental role we challenge the accepted notion that the inherent capacity of the mind becomes overloaded over the course of a lifetime, and suggest that the basic level of overload happens in a short period of time. Corrective action is taken by sleep. This suggests that the manifestations of sleep deprivation can be directly compared with the overload failure of the neural network.

One immediate consequence of this discussion is the notion that correlated information more rapidly leads to the network catastrophe. Boredom and sleepiness in humans thus becomes a manifestation of the need for sleep upon development of network catastrophe where sleep can alleviate this problem. Furthermore, the prescription of enhancing the concentration span in learning by supplying relatively orthogonal information is consistent with the pattern of learning which is pursued in schools, where rather than spend each day learning a different topic, topics are switched after regular intervals to prevent the well known manifestations of overload and the loss of functioning associated with such overload.

The specific concept of locking then has further implications for understanding the nature of loss of functioning upon sleep deprivation or lack of sleep. Specifically, locking within the network prevents the finer distinctions which are possible with the fully functioning network. This loss of finer distinctions is relevant not to an arbitrary set of behaviors, but rather to the set of behaviors which have been exercised during the waking hours. Thus sleep deprivation studies which evaluate the effect of sleep loss by testing functioning using behaviors which are largely orthogonal to the behaviors or input which the individual has dealt with in the waking hours will find little if any loss of functioning. However, studies which probe the response to subtle changes in well exercised functions will find large impairment. For example, if a train engineer is required to behave differently when two red lights follow each other within a certain interval of time, as opposed to two red lights which follow each other within a longer interval of time, after seeing many red lights at various intervals of time, none of which are shorter than the threshold, there will be a locking of behavior which will make it difficult if not impossible to switch behaviors when the criteria is met. This loss of subtlety due to locking is manifest thus in a "mechanization" of behavior.

The additional procedure used in this invention to inhibit or prevent overload failure of the network is selective relearning of memories. The term "selective" may not specify direct control but may be understood as a biased random process which, for example, preferentially reinforces stronger memories. The selective relearning procedure may be used also in the context of a conventional network without subdivision. However, the combination of selective relearning with a subdivided neural network is of particular significance. By strengthening the memories of selected states of each subnetwork separately, these subnetwork states continue to be relevant to the description of the states of the complete network. This establishes or reinforces the identity of the subnetworks and enables the objects represented as subnetwork imprints to be put together in ways which were not previously imprinted. Moreover the existence of randomness in the selective relearning process suggests that even when subnetworks are treated similarly, after training they may contain distinct and complementary information.

In considering the phenomenon of sleep similar processes are expected to occur. Sleep is known to be have several stages identified by different brain electrical signals (EEG). The stages of sleep may correspond to temporary dissociation of the brain into subdivisions. Slow Wave Sleep corresponding to the greatest dissociation where small neuron groups function independently of each other. At shallower levels of sleep larger groups of neurons are connected and waking is the fully connected state. Since the process of dissociation and relearning may be incremental, recent imprints (experiences) should be remembered in full, while earlier imprints become progressively decomposed into elements. However, the strength of memories is not solely related to the historical order and some early memories are maintained in strength by this procedure. Experimentally, a correlation has been made between sleep disorders and both schizophrenia and severe depression. The severe lack of SWS sleep in 50% of schizophrenic individuals may be interpreted as leading to a loss of ability to properly separate distinct information processing tasks.

The following discussion formalizes the theory explained above using examples of neural network performance. This is illustrated using a modified version of the Hopfield network with Hebbian learning defined as follows:

(1) Neurons, neuronal state.—N binary variables with values ±1.

The neural state is in the following represented as $v_i$ where i takes a value in the set $\{1, \ldots, N\}$ (2) Synapses—$N^2$ floating point variables. (symmetric synapses)

In the following synapses are represented as $H_{i,j}$ where i,j take values in the set $\{1, \ldots, N\}$ and $H_{ij}$ is said to connect between neuron i and neuron j.

(3) Neuron update rule (synchronous, zero 'temperature' T=0).

$$v_i(t) = \theta \left( \sum_i H_{ij} v_j(t-1) \right)$$

where $\theta(x)$ is a symmetric step function $\theta(x)=1$ for $x \geq 0$, $\theta(x)=-1$ for $x<0$. A neural network is said to evolve by the neuron update rule. In the following discussion the neural network evolution is assumed to be synchronous so that all neurons are updated simultaneously by the neuron update rule.

(4) Hebbian Learning An imprint of a neuronal state v consists of a modification of synapses using:

$$H_{ij}(t) = H_{ij}(t-1) + v_i v_j \quad i \neq j$$

(4) Hebbian Learning with controlled strength c of imprint—

$$H_{ij}(t) = H_{ij}(t-1) + c v_i v_j \quad i \neq j$$

(5) Memory—A neural state v is said to be a "memory" if it is a fixed point of the update rule.

(6) Conventional learning test—A set of p random neural states is imprinted $$H_{ij} = \sum_{\alpha=1}^{p} v_i^\alpha v_j^\alpha \quad i \neq j$$

One measurement gauge for this network is obtained by measuring the number of 'remembered' states (imprinted states which are memories) and determining an error fraction in remembering the states based on an average over sets of imprinted neural states.

FIG. 1 illustrates a plot of this error fraction as a function of the number of imprinted neural states for N=100. This result is obtained as follows:

(1) Generate p random neural states $\{v_a^\alpha\}$.

$$v_i^\alpha = \pm 1 \quad \alpha=\{1, \ldots, p\}, i=\{1, \ldots, N\}$$

(2) Imprint these neural states on the synapses of the neural network (Hebbian rule)

$$H_{ij} = \sum_{\alpha=1}^{p} v_i^\alpha v_j^\alpha \quad i \neq j$$

(3) Find the number of imprinted neural states which are stable:

$$p_{stable} = \sum_{\alpha=1}^{p} \prod_i \delta \left( v_i^\alpha, \theta \left( \sum_j H_{ij} v_j^\alpha \right) \right)$$

(where $\delta(i,j)$ is the Kroeniker delta function which is 1 if i=j and 0 otherwise)

(4) Find the error rate $$e = (p - p_{stable})/p$$

(5) Average the error rate over a number of trials (steps (1)–(4)) with fixed N,p.

Consider part of the neural state to be information representative of an object. The rest of the neural stab is considered to be representative of a background which can vary. The term 'representative' implies that the information is derived from the object but may not be a direct one-to-one binary mapping of a visual or auditory image of the object. An 'object' is taken to be any element, aspect, pan or pattern of a visual, auditory or other information field which can arise in more than one such field. We investigate the error rate for recall of the object as the size of the object's representation is varied compared to the background size. Let a number p of objects be represented by M neurons and the background be represented by N-M neurons. Here we consider all of the objects to be represented in the same pan of the network. After imprinting the objects with their background, we then change the background only and ask if the object is stable under a single neural update—i.e. if the object is identifiable on a different background. This simulation is closely related to basin of attraction simulations but asks a different question. In both simulations the state of some of the neurons are changed. In this case the question asked is whether the object is stable after changing the rest of the network. In the basin of attraction simulations, some of the neurons are also changed but the question asked is whether the whole neural state is recovered by a number of neuron update steps.

Figure 2:
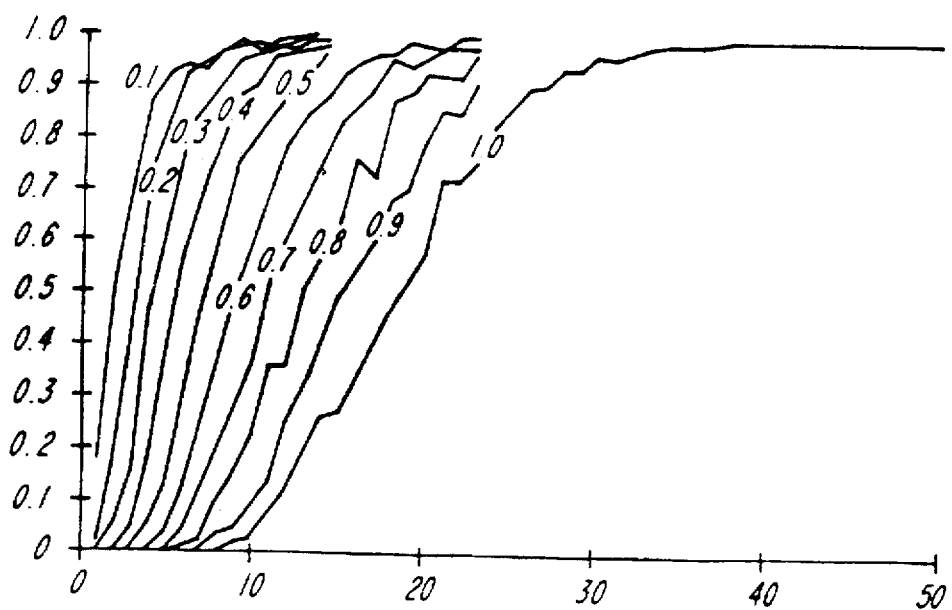
FIG. 2 is a plot of recall-error-fraction for object recognition for indicated values of object fraction as a function of p the number of neural states for N=100.
Figure 3A:
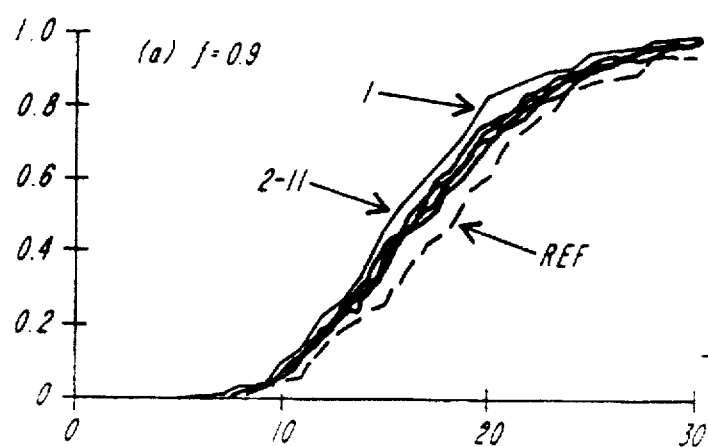
FIGS. 3a–3i are plots of recall-error-fraction for object-recognition as a function of p the number of neural states for N=100 where each figure (a–i) is for a different object fraction f (0.1–0.9) as indicated and where each curve is for the indicated number q (1–11) of repeat learning of the same p objects with different backgrounds.
Figure 3B:
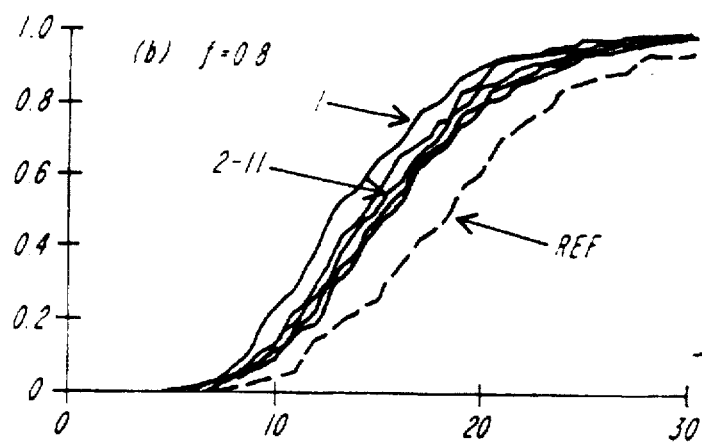
Figure 3C:
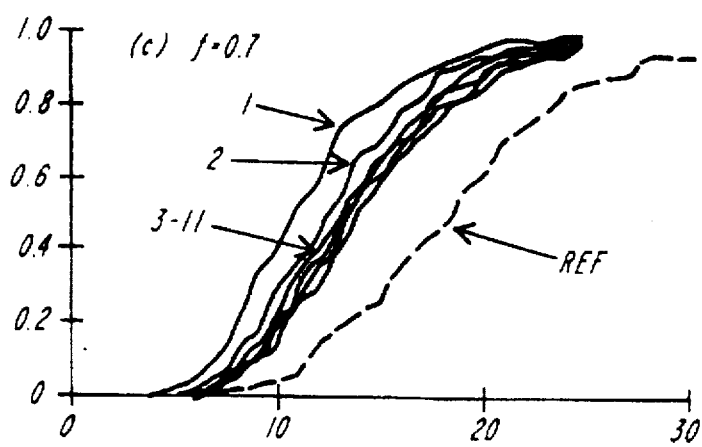
Figure 3D:
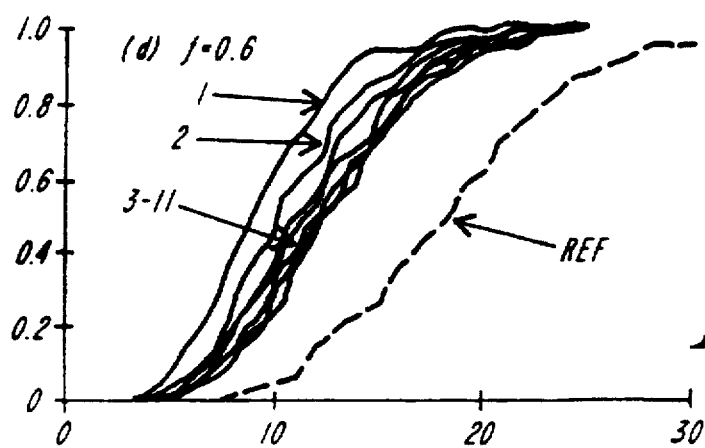
Figure 3E:
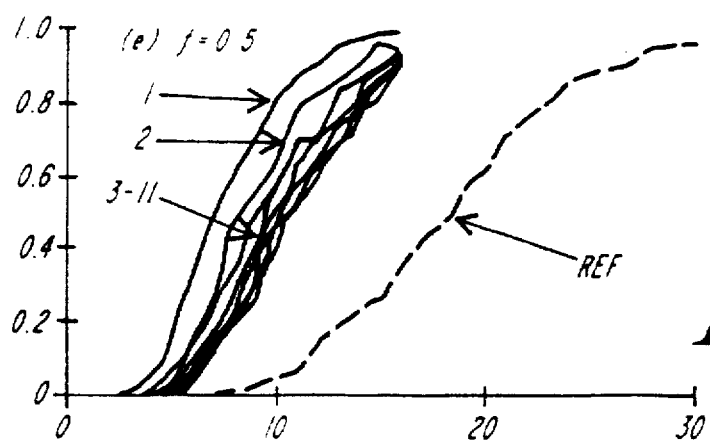
Figure 3F:
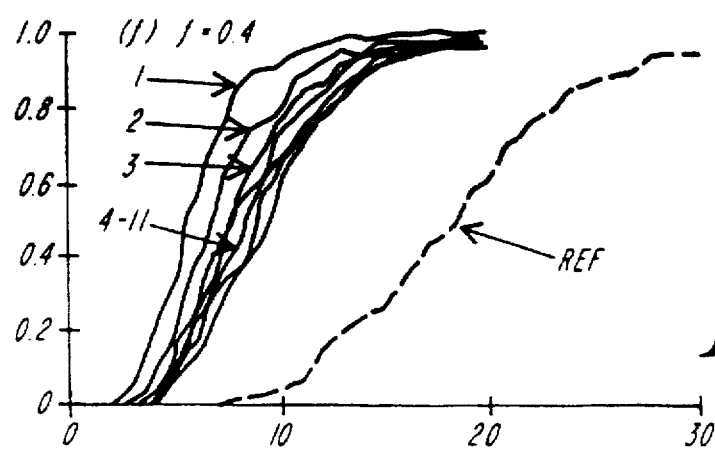
Figure 3G:
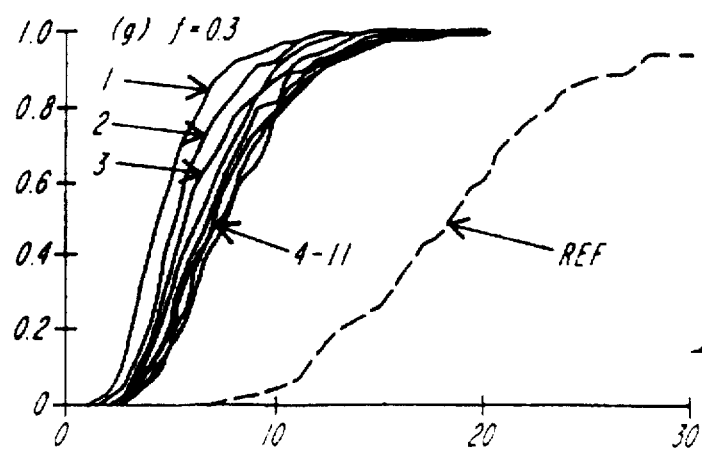
Figure 3H:
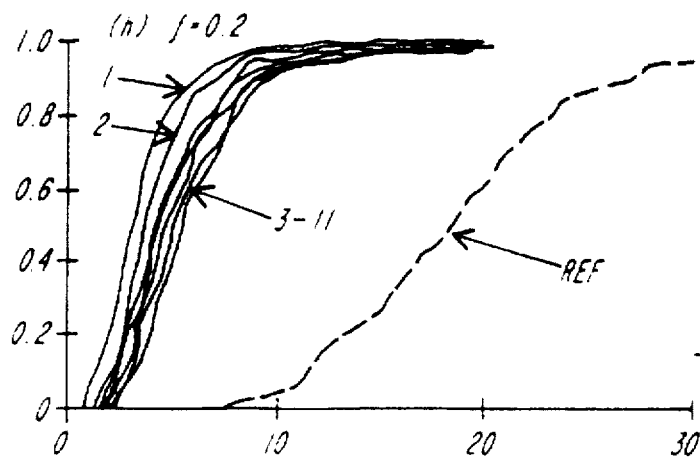
Figure 3I:
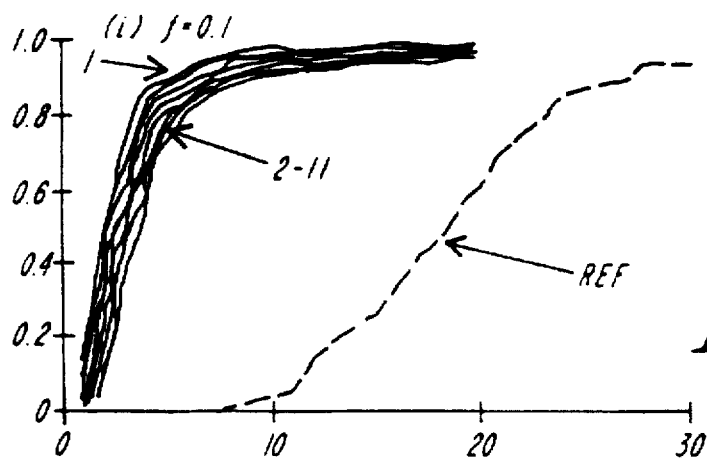

FIG. 2 is a plot of the error fraction for object recognition as a function of the number of neural states for N=100. The curves are labeled by the fraction of the network which represents the object to be remembered. The analysis of FIG. 2 proceeds as follows:

(1) Generate p random neural states $\{v_i^\alpha\}$.

$$v_i^\alpha = \pm 1 \quad \alpha=\{1, \ldots, p\}, i=\{1, \ldots, N\}$$

Identify the background as contained in the state of neurons $\{1, \ldots, B\}$, objects as contained in the state of neurons $\{B+1, \ldots, N\}$. The fraction of the network representing the object is $$f = (N-B)/N$$

(2) Imprint the complete neural states on the synapses of the neural network (Hebbian rule)

$$H_{ij} = \sum_{\alpha=1}^{p} v_i^\alpha v_j^\alpha \quad i \neq j$$

(3) Randomize the backgrounds to form new neural states $\{w_i^\alpha\}$ $$w_i^\alpha = \pm 1 \ \alpha=\{1, \ldots, p\}, i=\{1, \ldots, B\}$$
$$w_i^\alpha = v_i^\alpha \ \alpha=\{1, \ldots, p\}, i=\{B+1, \ldots, N\}$$

(4) Find the number of imprinted objects which are stable:

$$p_{stable} = \sum_{\alpha=1}^{p} \prod_{i=B+1}^{N} \delta\left(w_i^\alpha, \theta\left(\sum_j H_{ij} w_j^\alpha\right)\right)$$

note: Either $w_i^\alpha$ or $v_i^\alpha$ may be used as the first term in the delta function because they are the same for the object.

(5) Find the error rate $$e = (p - p_{stable})/p$$

(6) Average the error rate over a number of trials (steps (1)–(4)) with fixed N,p,f (or B).

Some of the utility of the network in recalling objects can be recovered by learning the same object with different backgrounds. The following analysis demonstrates that while the error rate is reduced, there is, however, a limit to the improvement which is possible.

Figure 4:
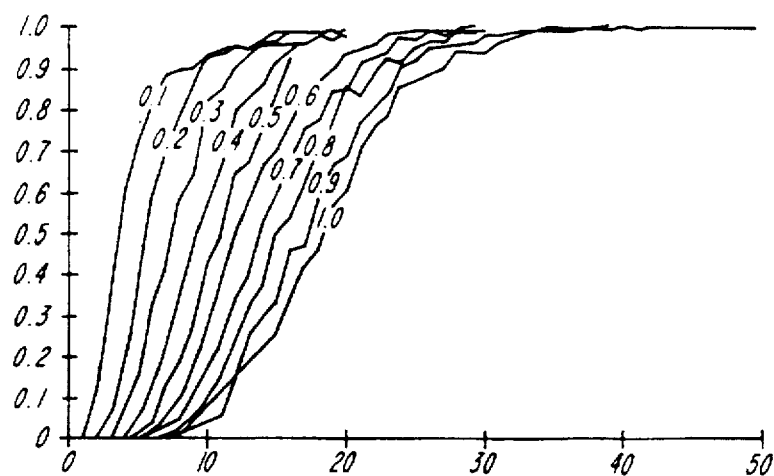
FIG. 4 is a plot of recall-error-fraction for object recognition for indicated values of object fraction as a function of p the number of neural states for N=100 after multiple imprints of the same object.

Referring to FIGS. 3a–3i, there are shown plots of error fraction for object recognition as a function of p the number of neural states for N=100. Each FIG. 3a–3i is for a different object fraction f as indicated. Different curves represent different numbers of relearning of the same p neural states with different backgrounds as marked for distinguishable curves. As q increases the error rate decreases (memory improves) but this improvement rapidly saturates for increasing q. The highest q plotted is 11 and for this value all have reached saturation. Similarly, FIG. 4 shows a plot of error fraction for object recognition for N=100 where each neural state has been learned eleven times with different backgrounds (saturation reached in improvement of error rate see FIGS. 3a–3i). The curves are labeled by the fraction of the network which represents the object to be remembered. This figure is a summary of the saturation curves in FIGS. 3a–3i. Curves labeled "ref" reproduce FIG. 1 for reference.

The analyses of FIGS. 3a–3i,4 are generated as follows:
(1) Generate p random neural states $\{v_i^\alpha\}$.

$$v_i^\alpha = \pm 1 \ \alpha=\{1, \ldots, p\}, i=\{1, \ldots, N\}$$

Identify the background as contained in the state of neurons $\{1, \ldots, B\}$, objects as contained in the state of neurons $\{B+1, \ldots, N\}$. The fraction of the network representing the object is $$f = (N-B)/N$$

(2) Perform (2a&b) q times
(2a) Imprint the complete neural states on the synapses of the neural network (Hebbian rule)

$$H_{ij} = \sum_{\alpha=1}^{p} v_i^\alpha v_j^\alpha \quad i \neq j$$

(2b) Randomize the backgrounds to form new neural states $\{v_i^\alpha\}$ $$v_i^\alpha = \pm 1 \ \alpha=\{1, \ldots, p\}, i=\{1, \ldots, B\}$$

(3) Randomize the backgrounds to form new neural states $\{w_i^\alpha\}$ $$w_i^\alpha = \pm 1 \ \alpha=\{1, \ldots, p\}, i=\{1, \ldots, B\}$$
$$w_i^\alpha = v_i^\alpha \ \alpha=\{1, \ldots, p\}, i=\{B+1, \ldots, N\}$$

(3) Find the number of imprinted objects which are stable:

$$p_{stable} = \sum_{\alpha=1}^{p} \prod_{i=B+1}^{N} \delta\left(w_i^\alpha, \theta\left(\sum_j H_{ij} w_j^\alpha\right)\right)$$

note: Either $w_i^\alpha$ or $v_i^\alpha$ may be used as the first term in the delta function because they are the same for the object.

(4) Find the error rate $$e = (p - p_{stable})/p$$

(5) Average the error rate over a number of trials (steps (1)–(4)) with fixed N,p,q,f (or B).

There are a variety of conclusions which may be drawn from this discussion, the simplest of which is that object memory is enhanced if information imprinted on the neural network only represents the object to be identified rather than a particular field of view which might include the object. This conclusion further supports the advantages expected from a subdivided network scheme, as described below.

The way a subdivided network according to the invention operates may be understood by supposing a set of visual fields which are inherently divided into two parts, left and right. On the left there can appear one of $N_L$ images and on the right there can appear one of $N_R$ images. These visual fields are to be imprinted on a neural network. For this type of image it is convenient to separate the neural network into Left and Right sub-networks. If there is no correlation between the images the connection between the Left and Right sub-networks can be very weak or nonexistent. The networks behave independently. Let there be a total of N neurons in the network with N/2 on each side. The maximum number of full images which can be stored is $(\alpha N/2)*(\alpha N/2)$. This is much greater than the number of full images which can be stored by a single network which is $\alpha N$. This increase is attained by severing the connections between the two sides. This paradox of an increase in number of images while degrading the network is possible because of the nature of the input images, that are explicitly constructed in a particular way. Network recall is performed by reconstructing the image on the right and on the left from partial information on each side.

If there is a correlation between the images L and R (when a particular image occurs on the right then only one particular image or one of a few images can appear on the left) then some connection between the two networks can be helpful in reconstructing the image during recall. This reduces the number of images which can be stored but increases the flexibility in the recall stage in terms of partial information presented.

Consider a network of composed of q subnetworks each with S=N/q neurons for a total of N neurons. An imprint of the network is a Hebbian rule imprint of a neural state v with N components.

The synapses are of two types, (1) subnetwork synapses connect between neurons within a subnetwork and (2) interconnecting synapses connect between neurons in different subnetworks.

We can write the full set of synapses H as a matrix consisting of submatrices (subnetworks) $H^{\mu_1 \mu_2}$ where the diagonal terms $H^\mu = H^{\mu\mu}$ are the subnetwork synapses and the offdiagonal terms are the interconnecting synapses as follows:

$$H = \begin{pmatrix} H_{1,1} & \cdots & H_{1,S} & H_{1,S+1} & H_{1,2S} & \cdots & & \\ \vdots & & \vdots & & & & & \\ H_{S,1} & \cdots & H_{S,S} & H_{S,S+1} & H_{S,2S} & & & \\ H_{S+1,1} & \cdots & H_{S+1,S} & H_{S+1,S+1} & H_{S+1,2S} & & & \\ H_{2S,1} & & H_{S+1,2S} & H_{2S,S+1} & H_{2S,2S} & & & \\ & & & & & \ddots & & \\ & & & & & & H_{N-S+1,N-S+1} & H_{N-S+1,N} \\ & & & & & & \vdots & \vdots \\ & & & & & & H_{N,N-S+1} & \cdots & H_{N,N} \end{pmatrix}$$

$$H = \begin{pmatrix} H^1 & H^{1,2} & \cdots & H^{1,q} \\ H^{2,1} & H^2 & & H^{2,q} \\ \vdots & & \ddots & \vdots \\ H^{q,1} & H^{q,2} & \cdots & H^q \end{pmatrix}$$

Dissociation (subdivision) of the network consists of reducing the values of the interconnecting synapses. Complete dissociation (subdivision) of the network consists of setting the values of the interconnecting synapses to zero. Assume that the information stored in each subnetwork is different from that in the other subnetworks. Two questions which can be asked are: (1) how many complete neural states can be stored in the completely-dissociated network?, and (2) how many distinct neural states can be stored in the completely-dissociated network?

For large enough N, theoretical studies provide the answer to question (1) as $\alpha(N/q)$, which is lower than the $\alpha N$ for the undivided network, but the answer to question (2) is $[\alpha(N/q)]^q$ which is much larger than $\alpha N$ for large enough N, where $\alpha$ is a number which is 0.145 for Hebbian rule learning, but may differ from this value for other schemes. This result is straightforward to understand since the capacity of a network (in terms of complete neural states) grows linearly with the number of neurons. Strictly speaking these formal results must be corrected due to the need to properly combine probabilities of error in each network, however, this does not affect the conclusions.

For example, for a network of 100 neurons subdivided into 2 halves these numbers are 15 memories for the full network (see FIG. 1), 7 full memories for the subdivided network, and 53 independent left/right memories (This differs from 7*7=49 because of round-off corrections). This example is described and simulated more fully below.

More generally, considering a network of N neurons we can consider the optimal number of subdivisions as:

$$\frac{d}{dq}\left(\left[\frac{\alpha N}{q}\right]^q\right) = q\left[\frac{\alpha N}{q}\right]^q \left(\operatorname{Ln}\left(\frac{\alpha N}{q}\right) - 1\right)_{q=q_{opt}} = 0$$

-continued $$q_{opt} = \frac{\alpha}{e} N$$

For this number of subdivisions the number of neurons in a subdivision would be only $e/\alpha$ a number by this calculation which would be about 19, and the number of memories storm (assuming that the usual formula applies which is only approximate in this small subnetwork limit) is e=2.7 or less than 3 on average. The total number of independent memories stored is:

$$N_{opt} = e^{q_{opt}} = e^{\alpha N/e}$$

This optimal subdivision size is based on considering the maximum number of neural states which can be recognized. Other measures of optimal subdivision depend on the task to be performed. For example, if we simply consider the number of independent bits which can be stored by the network then the optimal network is a fully-connected network.

The following table suggests the advantages which can be gained by subdivision if information can be appropriately subdivided into objects which can be mapped onto subdivisions of the network. It may be worth noting that the human brain (with $10^{11}$ neurons) has left and right hemispheres which are further subdivided into a hierarchy of subdivisions. Small divisions are sometimes modeled as having about $10^4$ in number. Further subdivisions into small neuron groups may also occur in the brain.

For our purpose we would like to ask a more complete question: How does the memory capacity for independent and complete memories vary with the strength of the interconnecting synapses? The strength of the interconnecting synapses will be adjusted by a uniform scaling by a factor of g. The above considerations specify the expected results for g=0 and 1.

The size of the subdivisions should be such as to contain the relevant amount of information for recognizing a particular object (see above discussion of object-background) and therefore the number of neurons in a subdivision must be varied appropriately for real tasks. For some applications it is possible to consider a system which adjusts the number of neurons adaptively to the task required adding or removing neurons during learning. For a more general purpose, the divisions are likely to be roughly hierarchical providing for larger subdivisions (e.g. hemispheres) which are further subdivided into networks which recognize objects, aspects of an object and features of an aspect of an object. This is similar to the division of written sentences into words, into letters into line-segments of print, or spoken sentences into words and words into phonemes. In these examples it is to be noted that the mapping of written or spoken objects onto the brain may not be so straightforward.

Table I below tabulates the storage capacity for various subdivision schemes. Subdividing the network increases the number of memories which can be stored because different combinations of subnetwork memories are stored. By this way of counting memories the optimal number of subdivisions qopt and the number of memories stored for the optimal number of subdivisions $N_{opt}$ is indicated. Note that the number of imprints needed to store this large number of memories is not very great. In particular it is only three for all cases of optimal storage.

TABLE I

| Neurons | Memories in Full network | Memories in 2 Subdivisions | Memories in 3 Subdivisions | $q_{opt}$ | $N_{opt}$ |
|---|---|---|---|---|---|
| 100 | 1.45E+01 | 5.26E+01 | 1.13E+02 | 5 | 1.48E+02 |
| 1000 | 1.45E+02 | 5.26E+03 | 1.13E+05 | 53 | 1.04E+23 |
| 10000 | 1.45E+03 | 5.26E+05 | 1.13E+08 | 533 | 3.01E+231 |

Consider a network large enough to be subdivided into three networks each of which can store three words (coded appropriately in binary form). A complete network would then be able to store nine sentences with three words each (since the storage capacity grows linearly with size).

On the full network we could imprint and recognize the following nine sentences:

| Big | Bob | ran. |
| Kind | John | ate. |
| Tall | Susan | fell. |
| Bad | Sam | sat. |
| Sad | Pat | went. |
| Small | Tom | jumped. |
| Happy | Nate | gave. |
| Mad | Dave | took. |

On the completely-subdivided network we could imprint the following three sentences:

| Big | Bob | ran. |
| Kind | John | ate. |
| Tall | Susan | fell. |

And the following sentences could be recognized:

| Big | Bob | ran. |
| Big | Bob | ate. |
| Big | Bob | fell. |
| Big | John | ran. |
| Big | John | ate. |
| Big | John | fell. |
| Big | Susan | ran. |
| Big | Susan | ate. |
| Big | Susan | fell. |
| Kind | Bob | ran. |
| Kind | Bob | ate. |
| Kind | Bob | fell. |
| Kind | John | ran. |
| Kind | John | ate. |
| Kind | John | fell. |
| Kind | Susan | ran. |
| Kind | Susan | ate. |
| Kind | Susan | fell. |
| Tall | Bob | ran. |
| Tall | Bob | ate. |
| Tall | Bob | fell. |
| Tall | John | ran. |
| Tall | John | ate. |
| Tall | John | fell. |
| Tall | Susan | ran. |
| Tall | Susan | ate. |
| Tall | Susan | fell. |

The central difference between the set of sentences which can be remembered by the full network and the subdivided network may be summarized by the notion of "content" vs. "grammar" the first set knows a full sentence but does not have knowledge of the divisibility of the sentences into parts which can be put together in different ways. The subdivided network set of sentences knows the objects but has no relationship between the objects, thus it knows grammar but does not know any context information like "who is it that fell?"

Clearly the actual process in the human brain is a combination of the two, where sentences "make sense" or are "grammatically correct" if they are put together out of largely interchangeable blocks or objects, but an actual event or recalled incident is a specific combination. This can be captured in the network by having a partial interconnection between subnetworks (weakened). Then there is a possibility of knowing objects while at the same time being able to recall particular incidents. Learning a sentence composed of elements which have been previously learned is 'easier' than learning a sentence with new words. Ease of learning may be measured in number of imprints necessary for recall, or in strength of imprint needed when using variable imprint strength coefficients c:

$$H_{ij}(t)=H_{ij}(t-1)+cv_i v_j, \, i \neq j$$

FIGS. 5a, 5b, 6, 7a–7e, 8–10 illustrate analyses showing the number of stable memories for various subdivisions This analysis is generated based on the following procedure:

(1) Generate p random neural states $\{v_i^\alpha\}$.

$$v_i^\alpha = \pm 1 \, \alpha = \{1, \ldots, p\}, i = \{1, \ldots, N\}$$

(2) Imprint the complete neural states on the synapses of the neural network (Hebbian rule)

$$H_{ij} = \sum_{\alpha=1}^{p} v_i^\alpha v_j^\alpha \quad i \neq j$$

(3) Dissociate the network into q subnetworks of equal size by a factor g.

$$H = \begin{pmatrix} H^1 & H^{1,2} & \ldots & H^{1,q} \\ H^{2,1} & H^2 & & H^{2,q} \\ \cdot & & & \cdot \\ \cdot & & & \cdot \\ \cdot & & & \cdot \\ H^{q,1} & H^{q,2} & \ldots & H^q \end{pmatrix}$$

$$H^i = H^i \quad i = \{1, \ldots, q\}$$
$$H^{i,j} = gH^{i,j} \quad i,j = \{1, \ldots, q\}, i \neq j$$

(4) Find the number of neural states which are stable that are composed of imprinted subneural states in combinations so that, for example, q1 out of q subnetwork states arise from the same imprinted neural state (S=N/q):

$$w_i^\alpha = v_i^{\alpha 1} \quad \alpha 1 = \{1, \ldots, p\}, i = \{1, \ldots, S\}$$
$$w_i^\alpha = v_i^{\alpha 2} \quad \alpha 2 = \{1, \ldots, p\}, i = \{S+1, \ldots, 2S\}$$

$$w_i^\alpha = v_i^{\alpha q} \quad \alpha q = \{1, \ldots, p\}, i = \{(q-1)S+1, \ldots, N\}$$

$$p_{stable} = \sum_{\alpha=1}^{p} \prod_i \delta\left(w_i^\alpha, \theta\left(\sum_j H_{ij} w_j^\alpha\right)\right)$$

(5) Find the error rate $$e = (p - p_{stable})/p$$

(6) Average the error rate over a number of trials (steps (1)–(4)) with fixed N,p,q, g, distinct pattern of αi (equal, unequal, etc.).

Figure 5A:
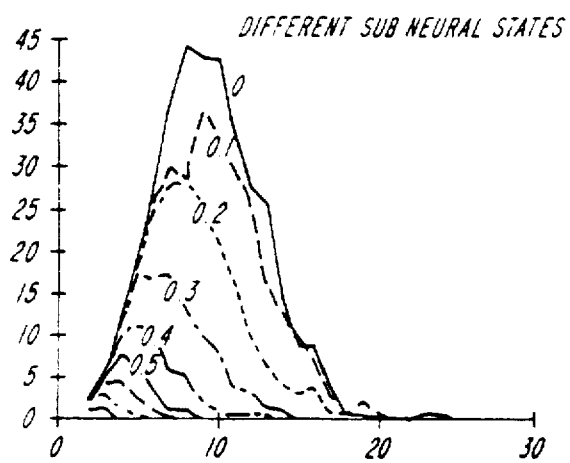
FIGS. 5a and 5b are plots of the number of stable memories after imprinting p states (horizontal axis) on subdivided neural network with 100 total neurons and two subdivisions with weakening of interconnection synapses indicated where (a) combines subnetwork states from different imprints and (b) uses imprinted states.
Figure 5B:
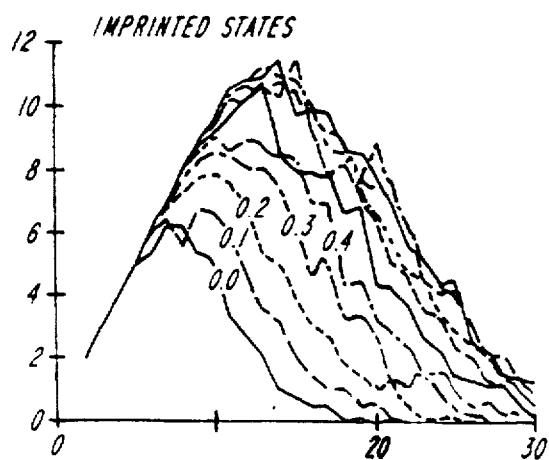
Figure 6:
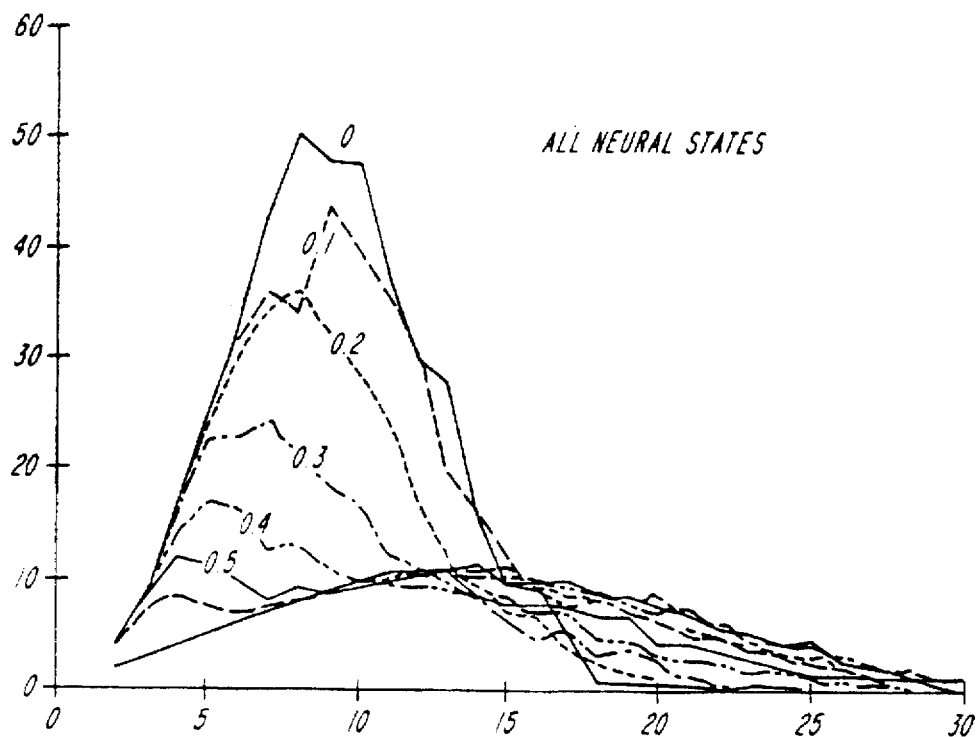
FIG. 6 is a plot of the total number of stable memories after imprinting p states (horizontal axis) on subdivided neural network with 100 total neurons and two subdivisions with weakening of interconnection synapses indicated including all sub network state combinations.

FIG. 5 shows the number of stable memories after imprinting p states (horizontal axis) on a subdivided neural network with 100 total neurons and two subdivisions. FIG. 5a shows the number of stable memories composed of different combinations of subnetwork imprinted memories where the complete state is not one of the imprinted states. FIG. 5b shows only the complete imprinted states. Note the difference in vertical scale. The different curves are labeled by the multiplicative factor g which weakens the interconnecting synapses. The curves labeled 0 are for a completely dissociated network. FIG. 6 shows the number of stable memories after imprinting p states (horizontal axis) on a subdivided neural network with 100 total neurons and two subdivisions with weakening g of interconnection synapses indicated on each curve and counting all possible combinations of subnetwork states. The curve labeled 0 is for a completely dissociated network.

As the interconnection strength is varied the number of complete memories as well as the number of memories formed out of different sub-memory combinations varies. For stronger interconnection where g is near 1 the network recalls up to 11 complete memories and essentially no others. This differs from the asymptotic number given by formal theory 14.5 both because of the comparatively small number of neurons (100) and because the formal treatment allows a few percent error in the retrieval of memories whereas for these simulations only exact recall is considered. Results may be generalized to include a small percentage of error which may not affect certain applications. For weak interconnections the number of complete memories is reduced from approximately 11 to 6. However, in this case, where there are two subdivisions, q=2, the number of different sub-memory combinations which are stable can be as high as 45. In order to balance the two effects it may be useful for many applications to allow intermediate interconnection strengths.

At interconnection strengths of 0.3, with 9 imprints of which nearly all are recalled, the number of total combinations recalled is nearly 20. This implies a balance between stability of imprinted memories and other combinations of imprinted subnetwork states with equal numbers of each for this case. Note that all of this analysis is based on the input of random states. When information is not random the optimization of interconnection strengths is likely to be different.

Imprinting on a network with four subdivisions results in various possibilities for subdivision states. Let $v_i^{\alpha 1}$ be the state of the ith neuron in the $\alpha_1$ imprint then we can consider the vectors $w_i^\alpha$ $$w_i^\alpha$$

$$w_i^\alpha = v_i^{\alpha 1} \quad \alpha 1 = \{1, \ldots, p\}, i = \{1, \ldots, S\}$$
$$w_i^\alpha = v_i^{\alpha 2} \quad \alpha 2 = \{1, \ldots, p\}, i = \{S+1, \ldots, 2S\}$$

$$w_i^\alpha = v_i^{\alpha q} \quad \alpha q = \{1, \ldots, p\}, i = \{(q-1)S+1, \ldots, N\}$$

described by the notation $w_i^\alpha \rightarrow (\alpha_1, \alpha_2, \alpha_3, \alpha_4)$. Then distinct types of vectors whose stability can be tested are (it is assumed that $p \geq 4$):

| Category | Number of such states | Label |
|---|---|---|
| $(\alpha_1, \alpha_1, \alpha_1, \alpha_1)$ | p | Imprinted states |
| $(\alpha_1, \alpha_1, \alpha_1, \alpha_2)$ | 4p(p−1) | Three equal substates |
| $(\alpha_1, \alpha_1, \alpha_2, \alpha_2)$ | 3p(p−1) | Two & two equal substates |
| $(\alpha_1, \alpha_1, \alpha_2, \alpha_3)$ | 6p(p−1)(p−2) | Two equal substates |
| $(\alpha_1, \alpha_2, \alpha_3, \alpha_4)$ | p(p−1)(p−2)(p−3) | Unequal neural substates |

Note that the number of states in the last category is largest for p large, however, for p<9 the second to last category has a larger number.

Figure 8:
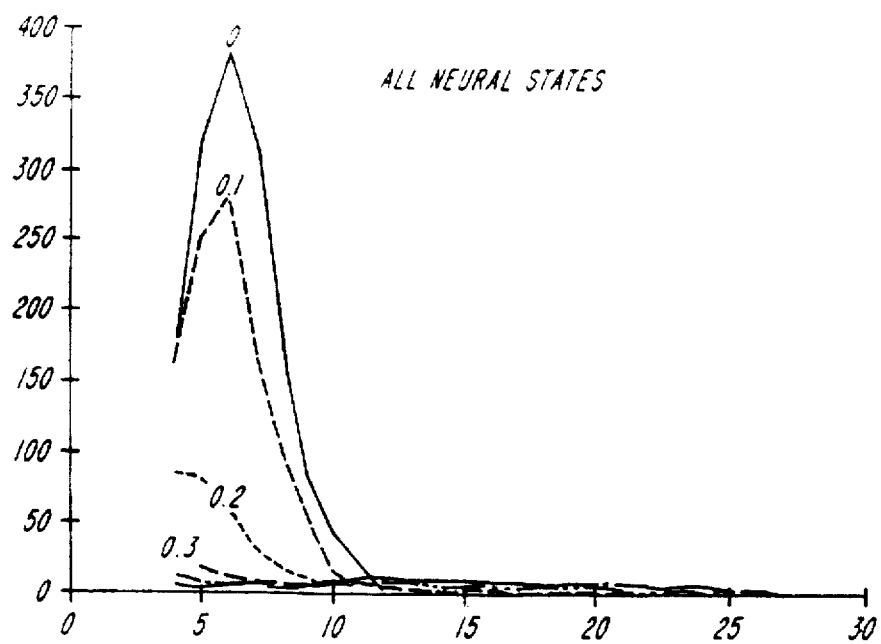
FIG. 8 is a plot of the total number of stable memories after imprinting p states (horizontal axis) on a subdivided neural network with 100 total neurons and four subdivisions with weakening of interconnection synapses indicated including all subnetwork state combinations.
Figure 7A:
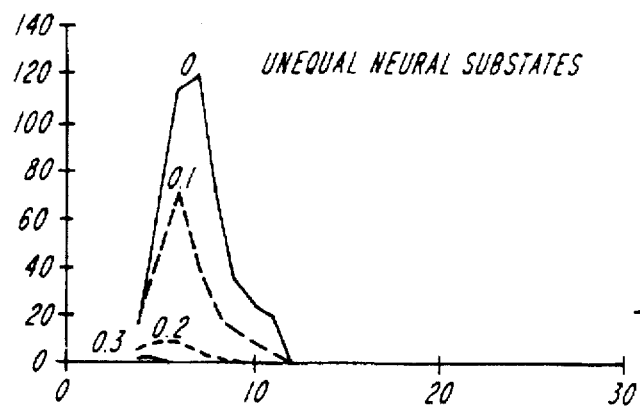
FIGS. 7a–7e are plots of the number of stable memories after imprinting p states (horizontal axis) on subdivided neural network with 100 total neurons and four subdivisions with weakening of interconnection synapses indicated where (a) combines subnetwork states from different imprints and (b) combines subnetwork states with two from the same imprint and (c) combines subnetwork states with two from one imprint and two from another and (d) combines subnetwork states with three from the same imprint and (e) uses imprinted states.
Figure 7B:
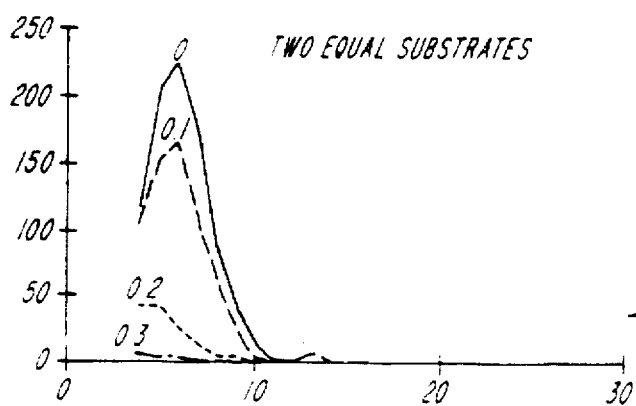
Figure 7C:
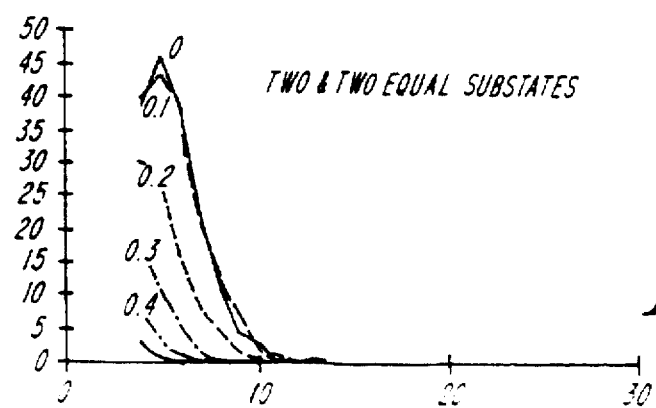
Figure 7D:
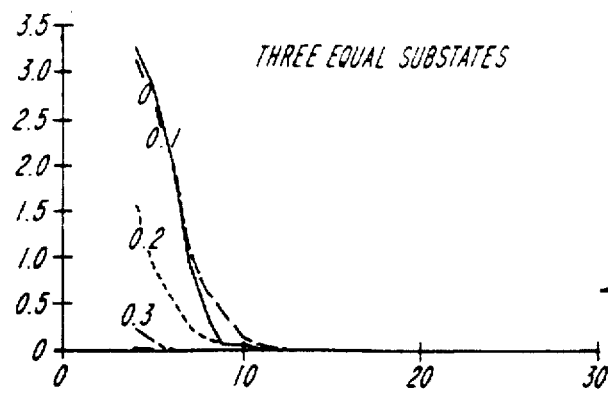
Figure 7E:
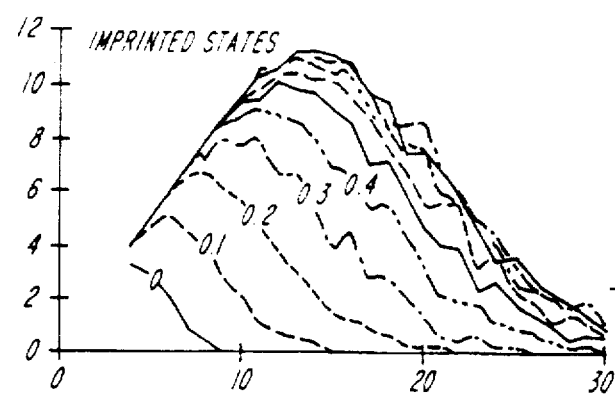
Figure 9:
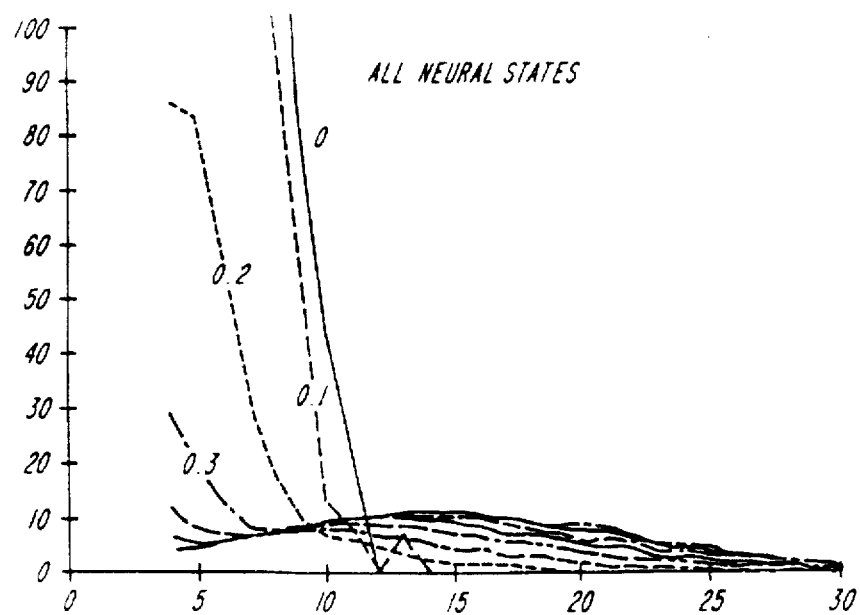
FIG. 9 is a plot of the total number of stable memories after imprinting p states (horizontal axis) on a subdivided neural network with 100 total neurons and four subdivisions with weakening of interconnection synapses indicated including all subnetwork state combinations with expanded vertical scale.
Figure 10:
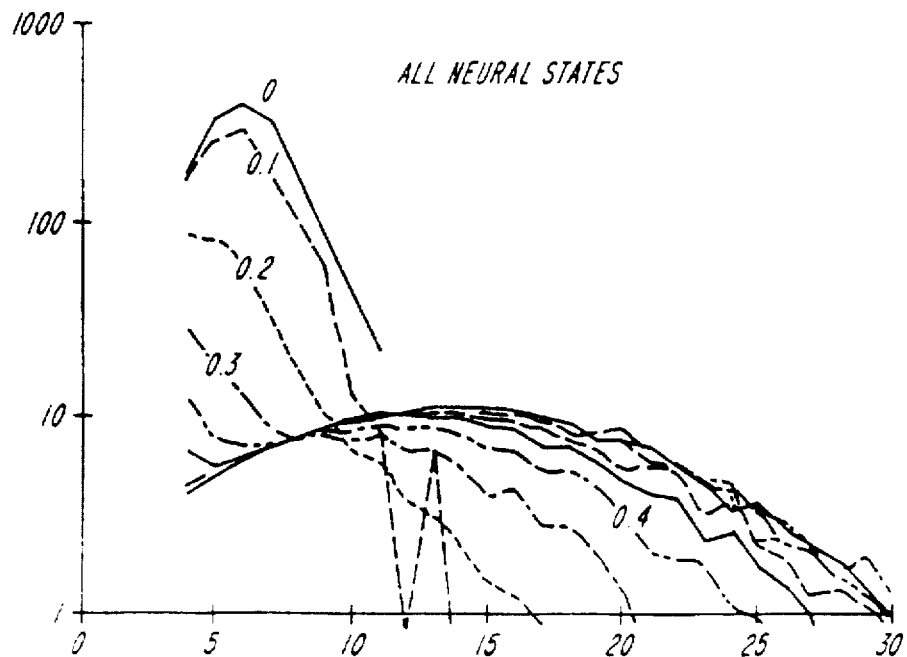
FIG. 10 is a plot of the total number of stable memories after imprinting p states (horizontal axis) on a subdivided neural network with 100 total neurons and four subdivisions with weakening of interconnection synapses indicated including all subnetwork state combinations with logarithmic vertical scale.

The number of stable memories of each type for 100 neurons in the complete network and after p imprints (horizontal axes) is indicated in FIGS. 7a–7e, and then totaled in FIGS. 8, 9 and 10. These plots indicate that the imprint memory capacity for a completely subdivided network is just over 3 compared with the full network capacity of 11. At an interconnection weakening factor of 0.2 it is possible to store 6–7 complete memories while enabling the stability of 70 other subnetwork combinations at the same time. These are roughly equally divided between those with two-equal-substates and those with two-&-two-equal-substates.

The subdivided network provides a systematic method for information organization in terms of elements (the stable states of subnetworks) which are organized in element-categories (the stable states of a particular subnetwork) and the compatibility relationships between elements as dictated by the intersubnetwork synapses. Of potential relevance to this scheme is the similarity of elements in a particular element-category measured using the inner-product of their neural representations.

Subdividing the network may provide the ability for artificial networks to manifest the object-oriented pattern-recognition tasks and higher information processing functions such as creativity in human functioning. However, by subdividing the network, the problem of dealing with overload becomes more acute. A scheme which enables overcoming overload failure in a subdivided network is selective relearning which also results in selective forgetting. Selective relearning is important whenever the capacity of a network is in danger of being exceeded because of the overload catastrophe which makes previous imprinted information inaccessible.

Neural networks, like other memories, have a limited capacity. This capacity depends on the number of neurons as discussed above where the maximum number of memories for a fully connected symmetric network is $\alpha N$ with $\alpha$ a number determined by the nature of the learning rule. When Hebbian learning is used the number of memories is known to be limited for large networks to $\alpha N$ with $\alpha=0.145$. If a number of neural states greater than this is imprinted on the network, the overloaded network does not recall imprinted memories (see FIG. 5b for g=1).

It is desirable for many applications to have a neural network which selectively retains some of the neural states which were imprinted and discards others. How should we determine which memories to retain? Appropriate criteria depend on the application. The most common criterion is the retention of the most recently imprinted states. This is implemented by memories which are termed palimpsest memories in which a modified Hebbian imprinting rule is used which strengthens the currently imprinted memory at the expense of prior memories.

In one example, the modification of a synapse is achieved using the rule:

$$H_{ij}(t) = f(H_{ij}(t-1) + Cv_iv_j)$$

$$f(x) = -A \quad \text{for } x < -A$$
$$f(x) = x \quad \text{for } -A < x < A$$
$$f(x) = A \quad \text{for } x > A$$

with C/A determining the degree of importance of the recent vs. previous imprints.

In a second example, systematically change the strength of each memory according to the rule:

$$H_{ij}(t) = H_{ij}(t-1) + e^{+\alpha\alpha/N}v_iv_j \quad i \neq j$$

where this is the $\alpha$th memory (note the dependence of the coefficient on the enumeration of the memories). A value of $\epsilon=8.44$ has been calculated as optimal for random neural states. In general such schemes reduce the effective capacity of the network because of the arbitrary difference in treatment of recent vs. previous memories and there is a significant degradation in total number of memories retained. This sacrifice occurs for the benefit of ensuring that some memories are retained after overload would otherwise occur.

Note that mathematically, an overall prefactor multiplying the synapse matrix H does not affect any results of retrieval or stability. Thus only the relative strength of different imprints is important to retrieval and stability. However, for many implementations, it may be preferred to maintain a particular normalization or bounds on the synapses. The arbitrariness of the normalization would not persist if a different update rule were implemented (e.g. with self-action of the neurons).

An important complement to the subdivided network scheme of the invention is the provision of a method of producing selective retention of imprinted neural states. While this method is generally order-dependent in that more recent imprints are more likely to be retained, there are other criteria inherent in the retention which are likely to provide advantages in various applications. The method is designed to prevent, or make less likely, overload failure. It is an approach suggested by considerations of the functioning of the human brain during sleep discussed above. Unlike the other approaches to palimpsest memories described above, it can be implemented as a separate step in learning, not as a modification of the imprinting rule. One advantage of this approach is that it may be executed after the imprint of significant numbers of neural states. Thus, for example, it may be implemented only when overload is threatened to occur in preparation for the imprint of new information.

The generic term which will be used for the process is "relearning." Relearning is suggested to work as a threshold operator on stabile memories—strong enough or different enough memories are reinforced and are further stabilized. Moreover, sufficiently similar memories are merged and weak memories are forgotten. A degree of randomness is present which is considered to provide advantages under certain circumstances, particularly when parallel systems exist and thus different systems should select distinct memories by the influence of randomness.

The selective forgetting of imprinted information may be used independent of, in conjunction with or in addition to processes which may modify the Hebbian-learning rule during each imprint as described above.

In order to effectively utilize the concept of neural subdivision, the whole network may be used for imprint of full images, however, when the inter-subnetwork connections are weakened the number of memories which can be effectively stored is reduced. To help ensure that the number of memories stored in a subdivision of the network does not exceed its capacity it is important to have a mechanism for selective forgetting of imprinted information.

In order to provide selective forgetting, one of several possible processes may be applied to a neural network. The processes quite generally are subdivided into two classes: (1) Local rules-processes which modify synapse values depending on local properties of the network, e.g. the synapse value itself. An example might be changing the value of a synapse from $H_{ij}$ to $g(H_{ij})$ where g is a linear or non-linear function; and (2) Global rules—processes which modify synapse values depending on the behavior of the network to be modified.

Local rules may be applied regardless of the state of neural activity or synapse values. Global rules require information from the whole network in order to modify a particular synapse. Included among global rules is synapse normalization to a common value or activity normalization by modifying synapse values. For example, in order to adjust the synapse values to ensure that the total activity level does not exceed some limit, it is useful to measure the total activity and use this information to modify synapse values.

A third category of rule could be considered intermediate between the local and global categories—a semi-local rule, where processes which modify synapses depend on the values of all the synapses affecting a single neuron. In general, local rules are considered to be easier to implement in biological or physical systems. Specific architectures may enable particular global or semi-local rules. For subdivided networks, the central purpose of introducing the concept of local and global rules; is that the existence of global rules (or even semi-local rules) suggests that the processes may be implemented when the subnetworks are temporarily separated from each other either completely or more separated than during imprinting or during operation.

The particular relearning scheme resulting in selective forgetting involves a local rule (rescaling of synaptic strengths) and a global rule (random-start, evolution-with-noise and relearning). One feature of this global rule is that it requires the network or subnetwork to function independently of the external inputs and in the case of a subnetwork, independently of other subnetworks.

It is convenient to introduce the use of the so-called basin-of-attraction of imprinted neural states as a measure of the performance of the neural network. Let us consider a particular state of the neural network $v_0$ which may be an imprinted state. The basin-of-attraction of $v_0$ measures the size of the region of possible network states which is 'attracted' to $v_0$. A neural state v is attracted to $v_0$ if v evolves to $v_0$ by application of the neuron update rule. The functioning of the neural network as an associative memory directly depends on the basin-of-attraction which enables the recovery of imprinted information. By providing the network with part-of the imprint to be recovered, if the pan-of the image is sufficiently large so that the state of the network resides in the basin-of-attraction of the imprint then neural evolution recovers the full imprint.

Figure 11:
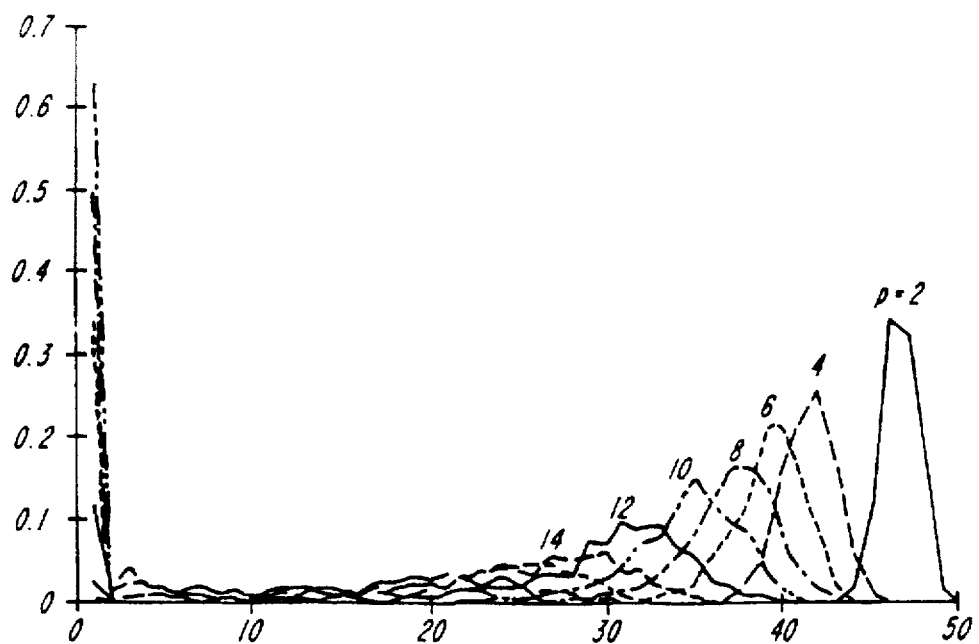
FIG. 11 is a plot of the distribution of sizes of the basin-of-attractions for different numbers of indicated imprints p on a network with 100 neurons normalized to one so that each curve gives the probability of finding a particular imprinted state with the specified basin of attraction.
Figure 12:
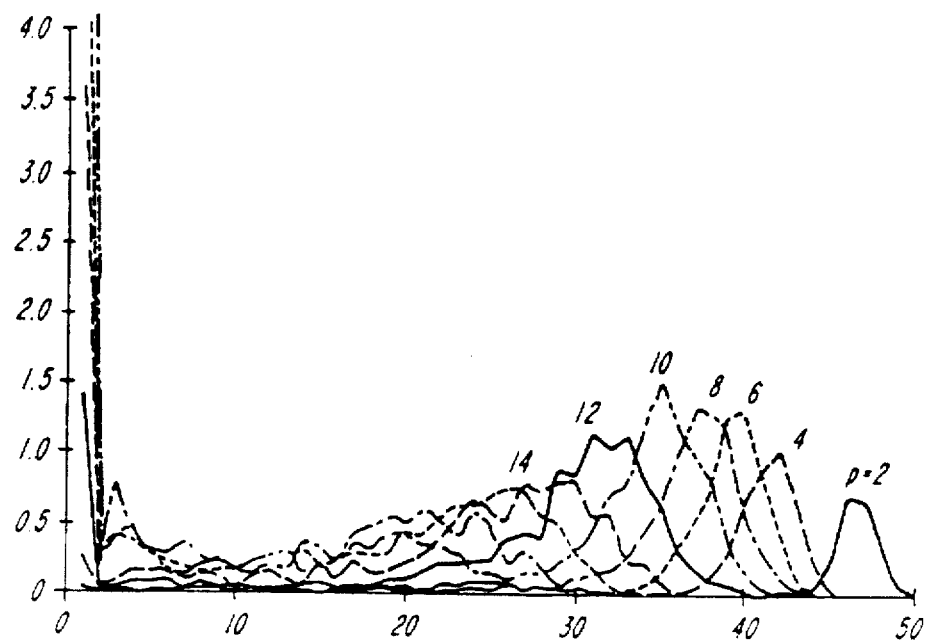
FIG. 12 is a plot of the distribution of sizes of the basin-of-attractions for different numbers of indicated imprints p on a network with 100 neurons normalized to p so that each curve gives the distribution of basin sizes for p imprinted states.

Referring to FIGS. 11 and 12, there is shown a distribution of sizes of the basin of attractions (horizontal axis—measured as discussed below) for different numbers of imprints p on a network with 100 neurons. FIG. 11 is normalized so that each curve gives the probability of finding a particular imprinted state with the specified basin of attraction (normalization=1). FIG. 12 gives the distribution of basin sizes for p imprinted states (normalization =p). The maximum possible size of the basin of attraction is 50 (½ of the number of neurons). As the number of imprints increases the average basin of attraction of each memory decreases and the width of the distribution of basins increases. In addition the number of imprinted states which are not remembered (basin-of-attraction=0 increases.)

The analysis of FIGS. 11 and 12 is generated as follows:

(1) Generate p random neural states $\{v_i^\alpha\}$.

$$v_i^\alpha = \pm 1 \quad \alpha = \{1, \ldots, p\}, i = \{1, \ldots, N\}$$

(2) Imprint the complete neural states on the synapses of the neural network (Hebbian rule)

$$H_{ij} = \sum_{\alpha=1}^{p} v_i^\alpha v_j^\alpha \quad i \neq j$$

(4) Find the basin-of-attraction of each of the neural states $v_i^\alpha$, where an unstable neural state is set to have a basin of attraction of zero. The following procedure quantifies the basin of attraction using the average minimum Hamming distance (number of unequal neuron states) to a state which is not in the basin-of-attraction of the neural state $v_i^\alpha$.

(4a) Set the neural state to $v_i^\alpha$ (4b) Pick an ordering of neurons $1(i)$ (4c) Switch the state of each neuron in sequence according to the ordering and find the minimum number of switches for which: the neural state resulting after at most a prespecified number n (taken to be 10) neural updates is not-equal to the neural state $v_i^\alpha$.

$$w_i^{b,0} = \prod_{j=1}^{b} (1 - 2\delta(j, l(j))) v_j^\alpha$$

-continued $$w_i^{b,r} = \theta \left( \sum_j H_{ij} w_j^{b,r-1} \right)$$

$$b(v^\alpha) = \min_b \left\{ \prod_i \delta(v_i^\alpha, w_j^{b,n}) = 0 \right\}$$

(4d) Average over choices of neuron orderings $1(i)$.

(5) Make a histogram of the basins of attraction for different $v_i^\alpha$, with fixed N, p.

In analyzing a method of relearning via imprinting, we first consider the effect of reducing the strength of all of the synapses before imprinting additional states. The outcome of sufficient reduction of the synapse strengths must be equivalent to having no prior imprints. By investigating the extent to which prior memories affect new imprints and new imprints affect prior memories, information relevant to the relearning procedure are obtained. The general reduction of prior synapse values is equivalent to the increase of the strength c of new imprints (as discussed above).

$$H_{ij}(t) = H_{ij}(t-1) + cv_i v_j \quad i \neq j$$

This procedure is itself a form of Palimpsest memory of which Example II given above is one possible way to specify the change from one imprint to the next. For our purpose we consider a network of 100 neurons and imprint 4 neural states with equal (unity) coefficients. Then the synapse strengths are multiplied by a factor g. Then 4 more neural states are imprinted and the synapse values again multiplied by g. This is repeated until a total of 16 neural states are imprinted.

Figure 13:
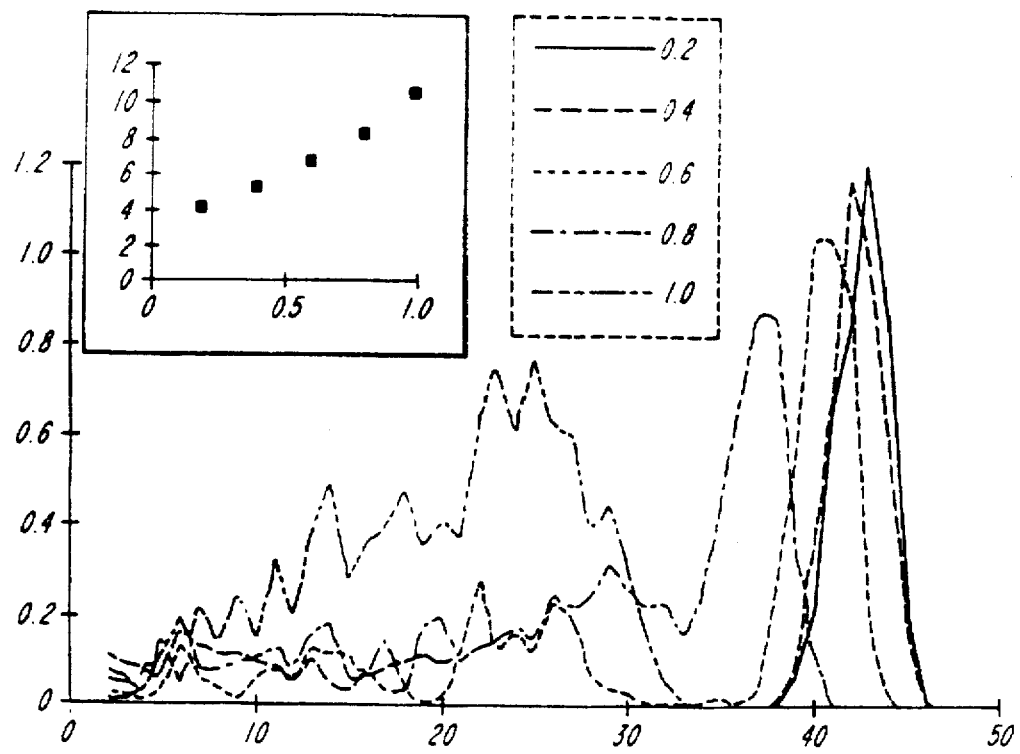
FIG. 13 is a plot of the distribution of sizes of the basin-of-attractions after sequentially imprinting sets of four memories and diminishing the strength of synapses by the indicated factor and the insert shows the total number of stable memories.

The results plotted in FIG. 13 demonstrate that for 16 memories imprinted with equal strength (g=1) the network is beyond the optimal number of imprints and only 10 imprints are recalled, and basins-of-attraction are degraded. By diminishing the strength of synapses the new imprints are better remembered at the expense of forgetting the previous set of memories. Each curve shows the distribution of basin-of-attractions for the imprinted states normalized so that the total number is the total number of imprints p=16. The curves are labeled by the factor g which scales the synapses between each set of 4 imprints. In the insert at upper left, the number of stable imprints is plotted as a function of g. By diminishing the interconnection strength between successive imprints the basin-of-attraction of the last four imprints are dramatically improved, however at the expense of reducing dramatically the basins of the other memories and eventually destabilizing them. Two conclusions which are reached based on this analysis are that diminishing the synapses is an effective mechanism for ensuring that successive imprints are learned effectively however, the older memories are degraded drastically.

This analysis is generated as follows:

(1) Generate p random neural states $\{v_i^\alpha\}$.

$$v_i^\alpha = \pm 1 \quad \alpha = \{1, \ldots, p\}, i = \{1, \ldots, N\}$$

(2) Imprint the first p1 neural states on the synapses of the neural network (Hebbian rule)

$$H_{ij} = \sum_{\alpha=1}^{p1} v_i^\alpha v_j^\alpha \quad i \neq j$$

(3) Rescale the network synapses by a factor g.

$$H_{ij} = g H_{ij} \quad i,j = \{1, \ldots, N\}, i \neq j$$

Note that here and in the following analysis descriptions an abbreviated notation is used instead of $H_{ij}(t) = g H_{ij}(t-1)$ where the equation is an assignment so that $H_{ij}$ to the right of the equal sign is the value before the update and the $H_{ij}$ on the left of the equal sign is the value after the assignment.

(4) Repeat steps (2) and (3) for each set of p1 neural states until all p neural states are imprinted.

note the equivalence to the expression:

$$H_{ij} = g^{p/p1-1} \sum_{\alpha=1}^{p1} v_i^\alpha v_j^\alpha + g^{p/p1-2} \sum_{\alpha=p1}^{2p1} v_i^\alpha v_j^\alpha + \ldots \quad i \neq j$$

(5) Find the basin-of-attraction of each of the neural states $v_i^\alpha$, where an unstable neural state is set to have a basin of attraction of zero. See previous specification.

(6) Make a histogram of the basins of attraction for different $v_i^\alpha$, with fixed N, p, g.

In order to improve upon the performance of this palimpsest memory it is desirable to perform a selective reinforcement of particular memories so that some of the older memories are reinforced. In order to achieve this effect it is possible simply to select some of the older memories and reimprint them. This is not a practical approach if the earlier imprints are not known at the time of reprocessing, or if independent functioning of the network from input specification is desired.

Selective reinforcement of prior memories may be achieved using the steps: (1) Starting from a random, pseudo-random or other preselected initial configuration, (2) Evolving the network according to the neural evolution rule or, to greater advantage, according to 'nonzero-temperature' (or 'noisy') neural evolution rule, and (3) imprinting the network (Hebbian learning) with the state after a prespecified number of evolution steps. Step (3) may be replaced by continuous imprinting during the evolution, or imprinting after a stable state is reached or other criterion is satisfied.

Figure 14:
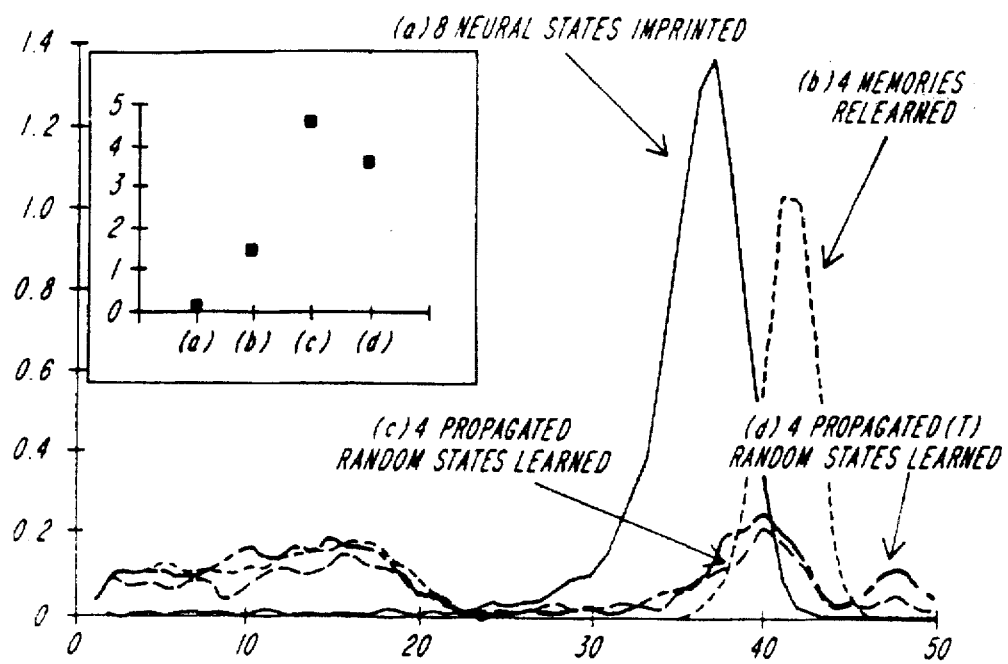
FIG. 14 is a plot of the distribution of sizes of the basin-of-attractions comparing different relearning procedures with curves (a) as reference for 8 imprinted states and (b) after reimprinting 4 of them and (c) after imprinting 4 evolved random states and (d) after imprinting 4 evolved random states with noisy-finite-temperature evolution and the insert showing the number of the original imprinted 8 states which are unstable.
Figure 15:
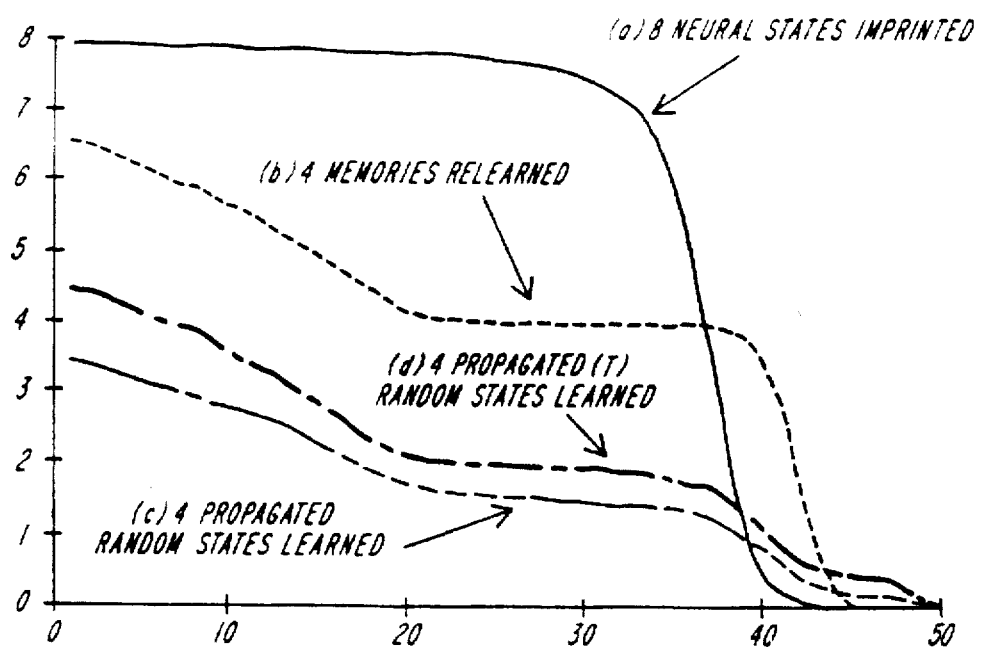
FIG. 15 is a plot of the number of basin-of-attractions greater than the horizontal axis value corresponding to the integral of curves in FIG. 14 comparing different relearning procedures with curves (a) as reference for 8 imprinted states and (b) after reimprinting 4 of them and (c) after imprinting 4 evolved random states and (d) after imprinting 4 evolved random states with noisy-finite-temperature evolution.

Referring to FIGS. 14 and 15, there is shown a comparison between three different reimprinting procedures. Curves (a),(b),(c),(d) display the distribution of basins-of-attraction for different imprinting procedures where curve (a) represents the starting point where eight (8) neural states are imprinted on a network with 100 neurons. In curve (b) an idealized case for re-imprinting is shown where four (4) of the originally imprinted states are imprinted again (this is equivalent to imprinting four imprints with twice the strength of the other four). As in FIG. 13 the effect is to reduce the basin-of-attraction of the neural states which are not reimprinted and increase the basin-of-attraction of the ones which are reimprinted. This represents an idealized case of selecting memories to strengthen at the expense of others. In curve (c) the case of imprinting four 'evolved-random' states which are obtained by applying the neural update rule to a random initial configuration. In curve (d) the case of imprinting four 'evolved-random' states which are obtained by applying the non-zero temperature with β=0.35 as described below. In both cases there is an enhancement of some of the basins of attraction. For curve (c) the number of basins enhanced is about 1.5 while for curve (d) it is about 2. Note that the basins-of-attraction of the evolved-random states are not included since these are not necessarily desired memories. The insert on the upper left shows the number of stable memories out of the eight originally imprinted states.

The results of the analyses, summarized in FIGS. 14 and 15, demonstrate that the reimprinting of evolved random states enables selective reinforcement of prior imprints. The improvement of curve (d) over curve (c) in FIGS. 14 and 15 is explained by the observation that the finite temperature evolution is more effective in obtaining the originally imprinted states. Formal analysis and simulations indicate that the problem for an evolved-random state to arrive at a memory is that there are many metastable states which trap the evolving neural state preventing it from arriving at the memories (the basin of attraction of the metastable states is a significant fraction of the total number of possible neural states). It is known that under some circumstances, the addition of noise can improve the recall of memories by enabling the evolution of the neurons to leave some of the metastable neural states. Thus we consider the effects of temperature on the ability of a random initial state to reach an imprinted state.

The analysis for generating FIG. 14 and 15 is as follows:

(1) Generate p=8 random neural states $\{v_i^\alpha\}$ $$v_i^\alpha = \pm 1 \quad \alpha = \{1, \ldots, p\}, i = \{1, \ldots, N\}$$

(2) Imprint p=8 neural states on the synapses of the neural network (Hebbian rule)

$$H_{ij} = \sum_{\alpha=1}^{p} v_i^\alpha v_j^\alpha \quad i \neq j$$

(3) Branching instruction:

For (a) proceed directly to (7).

For (b) imprint again the first p1=4 neural states on the synapses of the neural network (Hebbian rule). Then proceed to (7).

$$H_{ij} = H_{ij} + \sum_{\alpha=1}^{p1} v_i^\alpha v_j^\alpha \quad i \neq j$$

For (c,d) proceed (4) generate p2=4 random neural states $\{w_i^\alpha\}$ $$w_i^\beta = \pm 1 \quad \beta = \{1, \ldots, p2\}, i = \{1, \ldots, N\}$$

For (c)

(5c) update the neural states $\{w_i^\beta\}$ according to the neural update rule r=10 times.

$$w_i^{b,r} = \theta \left( \sum_j H_{ij} w_j^{b,r-1} \right)$$

proceed to (6)

For (d)

(5d)

update the neural states $\{w_i^\beta\}$ according to the T≠0 neural update rule (see below) r=20 times.

$$w_i^{b,r} = \theta_T \left( \sum_j H_{ij} w_j^{b,r-1} \right)$$

update the neural states $\{w_i^\beta\}$ according to the neural update rule r=10 times.

$$w_i^{b,r} = \theta \left( \sum_j H_{ij} w_j^{b,r-1} \right)$$

(6) Imprint p1=4 evolved-random neural states $\{w_i^{\beta,r}\}$ on the synapses of the neural network.

$$H_{ij} = H_{ij} + \sum_{\beta=1}^{p1} w_i^{\beta,r} w_j^{\beta,r} \quad i \neq j$$

(7) Find the basin-of-attraction of each of the neural states $v_i^\alpha$, where an unstable neural state is set to have a basin of attraction of zero. See previous specification.

(8) Make a histogram of the basins of attraction for different $v_i^\alpha$, with fixed N, p.

A standard implementation of a noisy (non-zero temperature) update rule for neurons follows a statistical rule for the neuron state at the next time step. The probability of each neuron value is given by:

$$\text{Probability}(v_i(t) = +1) = \left(1 + \tanh\left(\beta \sum_i H_{i,j} v_j(t-1)\right)\right)/2$$

$$\text{Probability}(v_i(t) = -1) = 1 - \text{Probability}(v_i(t) = +1)$$

where $\beta = 1/T$ and T is the effective temperature associated with the noise. For simplicity of notation we will write this update rule as:

$$v_i(t) = \theta_T\left(\sum_i H_{i,j} v_j(t-1)\right)$$

where $\theta_T(x)$ is suggestive of a finite temperature version of the symmetric step function. However, this notation means nothing else than the previous probabilistic expression. In the limit as T approaches zero the original T=0 update rule is recovered. It should be noted that the temperature as used here does not necessarily correspond to the physical temperature.

Figure 16:
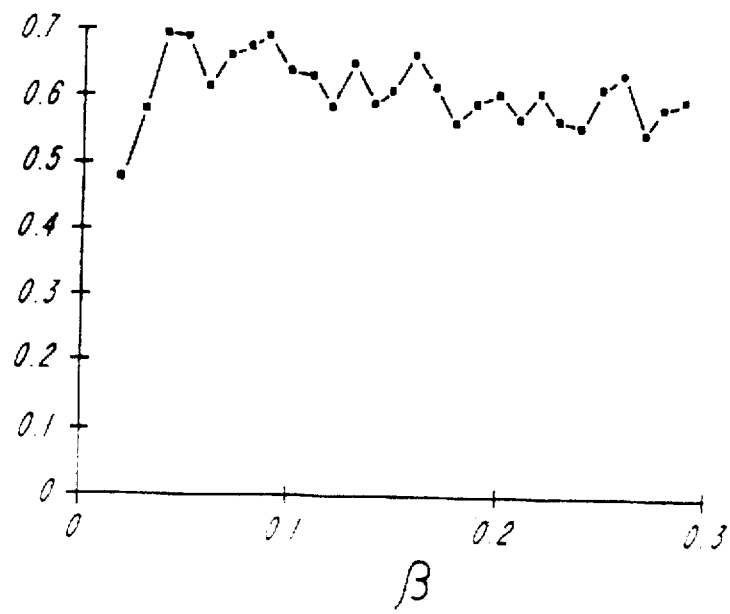
FIG. 16 is a plot of the fractional number of evolved-random states which result in originally imprinted states—memories—of the network for different values of the inverse temperature $\beta$.
Figure 17:
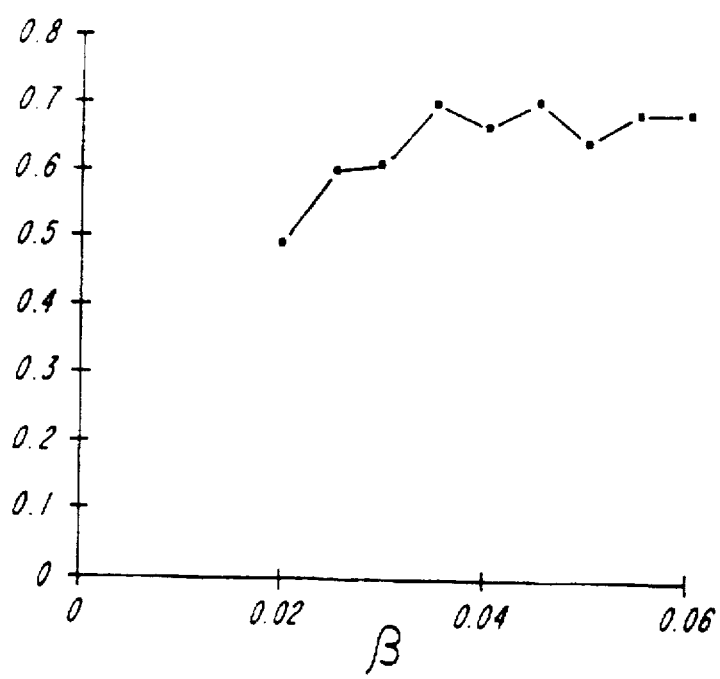
FIG. 17 is a plot of the fractional number of evolved-random states which result in originally imprinted states—memories—of the network for different values of the inverse temperature $\beta$.

With the introduction of the temperature dependent update rule, for the first time great care must be taken in defining the normalization of the synapse matrix $H_{ij}$. In keeping with the previous notation the default normalization is given by the unnormalized Hebbian rule learning. In order to systematically scale the results to different values of the number of neurons the value of $T_N = T/N$ is better used. Referring to FIG. 16 and FIG. 17, there is shown an evaluation of the number of evolved-random states which result in originally imprinted states of the network (memories) for different values of β. FIG. 16 shows a larger range of β values than FIG. 17. T=0 corresponds to β=∞. The optimal value for β in these simulations is around β=0.04.

The analysis of FIGS. 16 and 17 is generated as follows:

(1) Generate p1=8 random neural states $\{v_i^\alpha\}$.

$$v_i^\alpha = \pm 1 \quad \alpha = \{1, \ldots, p\}, i = \{1, \ldots, N\}$$

(2) Imprint p1=8 neural states on the synapses of the neural network (Hebbian rule)

$$H_{ij} = \sum_{\alpha=1}^{p1} v_i^\alpha v_j^\alpha \quad i \neq j$$

(3) generate a random neural state $\{w_i\}$ $$w_i = \pm 1 \quad i = \{1, \ldots, N\}$$

(4) update the neural state $\{w_i\}$ according to the neural update rule r1=20 times at temperature T.

$$w_i^r = \theta_T\left(\sum_j H_{i,j} w_j^{r-1}\right) r = \{1, \ldots, r1\}, i = \{1, \ldots, N\}$$

(5) update the neural states $\{w_i^{\beta,r}\}$ according to the neural update rule r2=5 times at T=0.

$$w_i^r = \theta\left(\sum_j H_{i,j} w_j^{r-1}\right) r = \{r1+1, \ldots, r1+r2\}, i = \{1, \ldots, N\}$$

(6) Find if the evolved neural state is equal to one of the originally imprinted states:

$$f_{stable} = \sum_\alpha \prod_i \delta(v_i^\alpha, w_i^r)$$

(7) Average $f_{stable}$ over samples to find the proportion of evolved-neural-states equal to one of the originally-imprinted-states.

The previous analysis in FIGS. 14 and 15 shows the use of evolved-random-state relearning in reinforcing some of the memories. The following analyses demonstrate the evolved-random state relearning at a temperature T and its effect on subsequent imprinting. The simulations consist of four main steps. The first step consists of imprinting eight neural states. The second step consists of selecting four random states, evolving them at a temperature T, then evolving them at T=0 (to bring them to the local minimum), and imprinting the result on the network. The third step consists of diminishing the strength of the synapses by a factor of 2. Thus ensuring for this simulation that the strength of reimprinted states is comparable with states to be imprinted. The fourth step consists of imprinting four (4) additional new states on the network. The purpose is to investigate the ability of the network to learn additional neural states. For the analyses, a temperature T=28.5 β=30.035 was chosen based on simulations of the recovery of imprinted states by evolved-random states at different temperatures. This temperature is close to the maximum temperature at which the imprinted memories remain stable at the chosen number of memories (8imprinted states for 100 neurons) 0<T<40.

Figure 18:
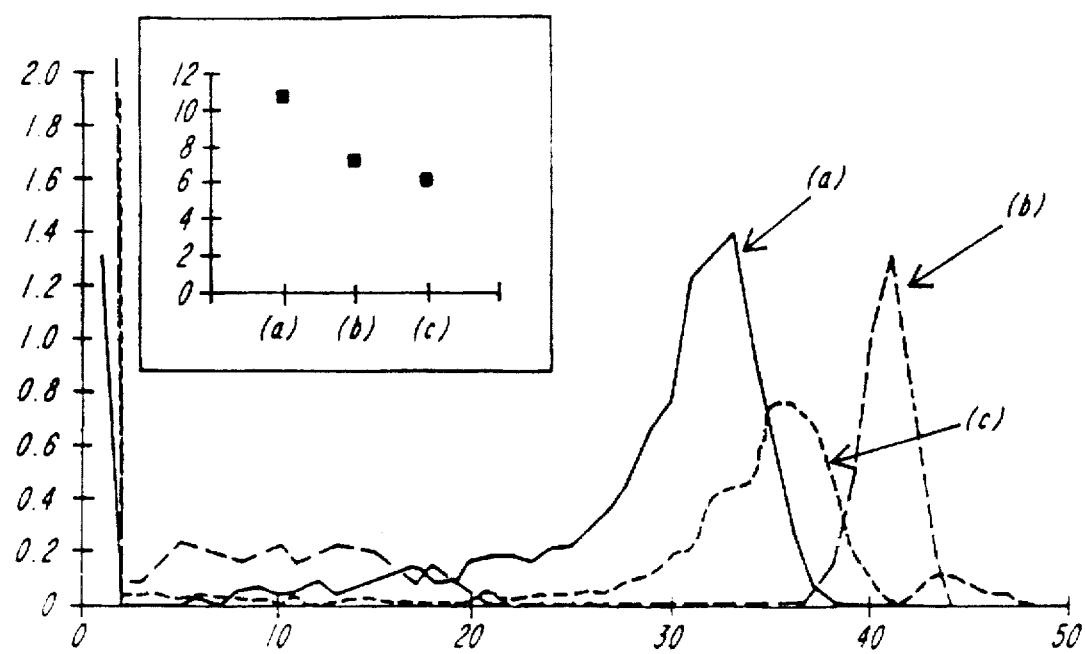
FIG. 18 is a plot of the results of simulations of the relearning by imprinting of evolved random states at temperature T=28.5 are illustrated as curve (c) while curves (a) and (b) provide reference examples.
Figure 19:
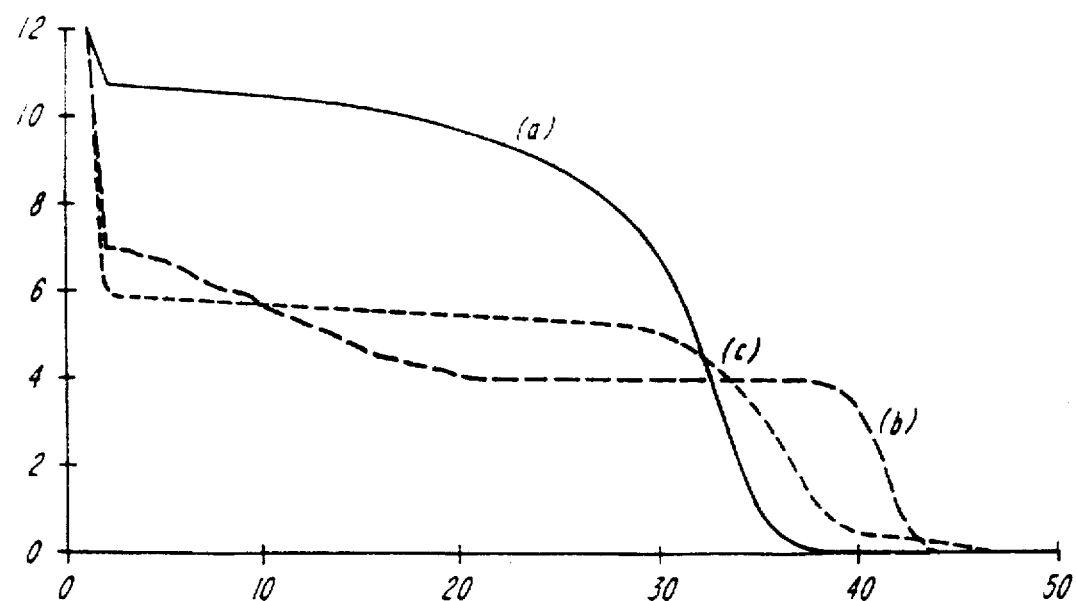
FIG. 19 is a plot of the number of basin-of-attractions greater than the horizontal axis value corresponding to the integral of curves in FIG. 18 showing relearning by imprinting of evolved random states at temperature T=28.5 are illustrated as curve (c) while curves (a) and (b) provide reference examples.

FIGS. 18 and 19 compare the results of relearning by imprinting of evolved random states at a temperature T=28.5 shown as curve (c) with two reference examples curves (a) and (b). In FIG. 18 the distribution of basins of attraction is shown normalized to 12. FIG. 19 shows the integrated number of memories with basins-of-attraction greater than the value of the horizontal axis. For both FIGS. 18 and 19 curve (a) is the result of imprinting 12 memories on the network, curve (b) is the result of imprinting 8 memories, then diminishing the strength of the synapses by a factor of 2 and then imprinting 4 additional memories and curve (c) is the result of imprinting 8 memories, then imprinting 4 evolved random states (basins-of-attraction not specifically included), then diminishing the strength of the synapses by a factor of 2 and then imprinting 4 additional neural states. The total number of basin-of-attractions measured in each case is 12. The insert in FIG. 18 shows the total number of memories tested which are stabile having basins of attraction greater than zero. The results illustrated have been averaged over many examples.

The results of the analyses, summarized in FIGS. 18 and 19, demonstrate that the reimprinting of evolved random states enables selective reinforcement of prior imprints. In FIG. 18 curve (a) demonstrates the degree of degradation of the basins of attraction when 12 memories are imprinted.

Curve (b) demonstrates the effect of imprinting 4 new memories after diminishing the strength of the synapses by a factor of 2. As explained in prior examples this results in effective recall of the recently imprinted neural states at the expense of the previously imprinted neural states. The only difference between curves (b) and (c) is the insertion of the procedure of evolving four random states, first at temperature T then at T=0 and imprinting the result. Aside from their effect on the network these neural states are not considered in the evaluation of basins-of-attraction. The result is, however, that the imprint of four new states does not result in the nearly complete degradation of the basins-of-attraction of prior memories. Instead, the newly imprinted memories have slightly smaller basins of attraction, and they are roughly the same in size to some of the original 8 neural states. Others of the original set of imprints have been completely forgotten. Thus there is a more dramatic distinction between those remembered and those (nearly) forgotten.

It is important to note that if the stability criterion is the only one used to evaluate this procedure, then the indication would be that the relearning procedure diminishes the number of stable memories as indicated in the insert. However, the effectiveness of the relearning is demonstrated by considering the basins of attraction. This result may also be more clearly seen in FIG. 19. This figure shows the integrated number of imprinted states with a basin of attraction grater than a given value. The curve (a) shows the lowered and broadened distribution of basin sizes characteristic of 12 imprints on the network. Curve (b) shows the existence of two populations of neural states, four states with large basins of attraction and roughly three more (out of 8) with substantially smaller basins of attraction. Curve (c) shows the compromise which results from the random relearning which selects roughly 2 of the original 8 memories to reinforce and the rest are essentially completely forgotten. The nearly horizontal curve for low values of the basin-of-attraction threshold demonstrates the effectiveness of the distinction between remembered and forgotten states.

This procedure is a particular scheme which demonstrates different properties from those of other palimpsest schemes or overload prevention schemes or optimal storage schemes described in the literature. It is therefore not expected to be the best scheme for all applications. However, it is expected to be particularly well-suited to subdivided neural architectures where each subdivision is expected to have well-defined memories which serve as the building blocks for the complete neural states of the network. Relearning in a subdivided network may be implemented using a temporary partial or complete dissociation of the network achieved by diminishing the synaptic weights which connect between subdivisions. During the temporary dissociation a relearning proceedure may be performed. Other applications where this scheme is used for a single fully connected network are also possible.

The analysis of FIGS. 18 and 19 is generated as follows:

(1) Generate p1=8 random neural states $\{v_i^\alpha\}$.

$$v_i^\alpha = \pm 1 \; \alpha=\{1,\ldots,p\}, i=\{1,\ldots,N\}$$

(2) Imprint p1=8 neural states on the synapses of the neural network (Hebbian rule)

$$H_{ij} = \sum_{\alpha=1}^{p1} v_i^\alpha v_j^\alpha \quad i \neq j$$

(3) Branching instruction:
For (a): proceed directly to (5).
For (b): proceed directly to (4).
For (c):
(3c 1) generate p2=4 random neural states $\{w_i^\beta\}$ $$w_i^\beta = \pm 1 \; \beta=\{1,\ldots,p2\}, i=\{1,\ldots,N\}$$

(3c2) update the neural states $\{w_i^\beta\}$ according to the neural update rule r1=20 times at T=1/0.035.

$$w_i^{b,r} = \theta_T\left(\sum_j H_{i,j} w_j^{b,r-1}\right) \quad r=\{1,\ldots,r1\}, i=\{1,\ldots,N\}$$

(3c3) update the neural states $\{w_i^{\alpha,r}\}$ according to the neural update rule r2=5 times at T=1/0.035.

$$w_i^{b,r} = \theta\left(\sum_j H_{i,j} w_j^{b,r-1}\right)$$

$$r = \{r1+1,\ldots,r1+r2\}, i=\{1,\ldots,N\}$$

(3c4) Imprint p2=4 evolved-random neural states $\{w_i^{\beta,r0}\}$ r0=r1+r2 on the synapses of the neural network.

$$H_{ij} = H_{ij} + \sum_{\alpha=1}^{p1} w_i^{\beta,r0} w_j^{\beta,r0} \quad i \neq j$$

(4) Rescale the network synapses by a factor g.

$$H_{ij} = g H_{ij} \; i,j=\{1,\ldots,N\}, i \neq j$$

(5) Generate p2 additional random neural states $\{v_i^\alpha\}$.

$$v_i^\alpha = \pm 1 \; \alpha=\{p1,\ldots,p1+p2\}, i=\{1,\ldots,N\}$$

(6) Imprint the neural states on the synapses of the neural network (Hebbian rule)

$$H_{ij} = H_{ij} + \sum_{\alpha=p1}^{p1+p2} v_i^\alpha v_j^\alpha \quad i \neq j$$

(7) Find the basin-of-attraction of each of the p=p1+p2 neural states $v_i^\alpha$, where an unstable neural state is set to have a basin of attraction of zero. See previous specification.

(8) Make a histogram of the basins of attraction for different $v_i^\alpha$, with fixed N, p. For FIG. 19 integrate the histogram from a specified value up to 100.

The analyses described may be enhanced by a consideration of the following:

(1) Slight deviation of remembered state from stored state. Useful recall is not only for perfect recall. It is possible, for example, to set a limit of 3% or 10% errors and to include remembered states with this error.

(2) Merging of stored states into a common remembered state. When several stored states are similar, the remembered state may be a merged state consisting of overlapping parts of similar states. This may still be a useful memory when the overlap is significant. However, it may also give rise to errors in associations. These errors would most likely be unacceptable in a uniformly connected network, but in a subdivided network, other neural subdivisions may serve to correct such mis-associations and enable them to be constructive in their correct or nearly correct aspects.

(3) Modification of the dynamics according to the addition of a local coupling of the neuron to itself which inhibits or promotes a change from the present state of the neuron to the next state of the neuron. In the above description this would be included as the term $H_{ii}$ which is explicitly set to zero throughout the above discussion. This provides an additional parameter for optimizing the performance of the network. For some purposes it may work like the noise or temperature parameter. Setting $H_{ii}$ to a negative value causes the neuron to seek to change its value and is a destabilizing influence on the neural states. This is similar to the refractory time of neurons in the brain which require some time before they can be active again, and also have a greater tendency to fire when they have been inactive for longer than a refractory time.

(4) Incorporation of second order or 'transistor' terms in the neuronal dynamics as:

$$v_i(t) = \theta \left( \sum_{j,k} G_{ij,k} v_j(t-1) v_k(t-1) \right)$$

We term this a 'transistor' term because it represents the impact of one neuron (j) on a second neuron (i) mediated by a third neuron (k). Such terms may be useful in a variety of applications.

(5) Incorporation of non-symmetric synapses where $H_{ij} \neq H_{ji}$. There is some ability of such synapses also to emulate the function of 'transistor' terms by using multiple stages (neuron (j) and (k) influence neuron (l) which in turn influences neuron (i).

(6) For use in a particularly defined application, the random states above, with the exception of evolved-random states, are replaced by particular states which are to be remembered. Recall is performed by using part of the memory and evolving the neural state to its fixed point (attractor). This is known as a content-addressable, or associative memory. It is important to recognize that there is an inherent trade-off in neural networks between the number of stable memories and their basins of attraction. Thus there have been developed many learning rules which may be of advantage in certain applications and increase the number of stable memories up to the theoretical limit, $\alpha=2$, however the basins of attraction must be diminished by this procedure to zero.

(7) Modifications of the representation scheme or variables used to describe the network. Neuron activity and synaptic weights may be represented in digital or analog form. Variables used may be binary or continuous. Synchronous or asynchronous neural dynamics may be used. The representation of neurons and synapses and the network behavior may be expanded to incorporate other features describing more realistically biological neural networks or to include features useful for particular applications such as time delays in axon transmission and synaptic activity and bias of the network to have asymmetric levels of firing and quiescent neurons. Moreover, the network description may be expanded to include network activity coupled global variables affecting neural network activity such as adrenaline or other hormones. Moreover, during the training of the network the number of neurons may not be a constant so that neurons are added or removed using a statistical procedure biased due to local or global values of neuron activity or synaptic weights.

(8) A second architecture which may be considered as distinct but related to the subdivided architecture is the continuous field architecture described through the existence of a spatial array of elements where a distance between neurons in the space may be defined. In this architecture subdivision and temporary-dissociation-with-relearning corresponds to diminishing the longer range synapses compared to the short range synapses. This architecture may be generalized by allowing each neuron to be replaced by a subnetwork so that the continuous field becomes a continuous field of subnetworks. More generally it is possible to define the 'distance' between neurons through the synaptic weights achieved through a specific designed dissociation procedure.

(9) For a variety of applications it may be desirable to use a network which inherently has fewer synapses than the number which would connect all neurons. Indeed, the use of fewer synapses may in part or in whole replace the use of weaker synapses connecting between subnetworks. In some cases the network may be better described as composed of subnetworks with interconnecting neurons. The temporary network dissociation may then be achieved by temporary bias of the activity or changes in the dynamics of interconnecting neurons. Moreover, connector neurons may themselves correspond to network subdivisions.

The advantages achieved using the sub-divided network scheme described above may be applied to many problems in quite diverse fields of applications. One important application is directed to the field of pattern recognition, a primary example of which is speech recognition. Here, samples of speech are input and phonetic symbols or letters are produced as output. Other examples of pattern recognition include identifying objects in a visual field, such as for identifying defects in manufacturing, data-searching or reduction, finding cases of interest—for example a database of consumer information may be searched to identify individuals for targeted advertising, and visual data compression.

Pattern recognition tasks generally involve taking particular realizations of a data field and identifying the data field as a member of one or more pre-specified categories. In some cases useful categories may be identified only through a task to be performed. Pattern recognition is of central importance in training a system to respond to inputs because the training may be done by category rather than for each possible realization of the input. The advantages are multiplied when the categories may be represented as selections of subcategories.

Attractor neural networks and many realizations of feed forward neural networks may generally be described as categorizers of data. In an attractor network the data may considered to be divided into categories which are the basins of attraction of the network. The stable points may be considered to be labels for the categories. A subdivided network improves on the performance of the conventional network by enabling a category to be described using several labels consisting of the stable points of each of the subnetworks. For a completely subdivided network this is precisely the case, while for a partially subdivided network the labels are compromises between single labels per category and several labels.

Historically, one problem with using an attractor network for applications is the lack of direct control on output categories. The categories arise from the architecture of the network and the training sequence. One way to achieve the desired categories is to manipulate the architecture 'by hand' to achieve the desired categories. This process involves mapping stable points of the network onto the desired categories and adjusting the architecture to ensure that category boundaries are consistent with output categories desired. This is an extremely difficult task which may be more difficult than solving algorithmically the pattern recognition problem itself. For some limited number of well understood tasks this may be made more feasible by the use of a subdivided architecture. The procedure for this is described as Procedure B.

Our central approach (Procedure A below) to the design of a neural network for a particular pattern recognition task, is the use of pre-specified input and output functions and a neural network in between which is trained by a reward scheme. The reward scheme results in the network acting as an additional mapping which results in the whole combination of input-functions/neural-network/output-functions mapping the data fields onto the desired categories. While the approach is quite general, any particular application requires careful design of the input function and output functions so as to (a) enable the categorization, (b) optimize the learning speed and (c) optimize the number of variables or speed of operation of the network. By (a) it is meant that if the input functions chosen discard essential information, or if the output functions do not utilize enough independent bits of the network it is impossible to perform the mapping. If the pattern recognition task is a solved one, then the input and output functions may be merged into a single input/output function with no intermediate network. Similarly, for a large enough neural network and for arbitrary long training, within certain assumptions, it is possible to train any pattern recognition task. One of the central advantages of this approach is that partial information, and intuitive knowledge about a pattern recognition task can be utilized to reduce the difficulty in developing a complete system. Furthermore, such systems may be trained to perform tasks which are not fully specified in advance. The specialization for a particular task may be made later and make use of the flexibility of adaptation. The architecture and initial training provides some structure for input and output which facilitates learning for a range of tasks.

There are many design decisions which must be made in developing a subdivided network architecture for a particular application. In addition to the choice of input and output functions, the subdivided network requires a choice of the architecture of subdivisions. A natural subdivision is between input and output regions of the network. Additionally, the input functions are generally to be understood as retaining particular aspects of the input data and the output functions as representing particular aspects of the output categories. Thus it is natural to separate the network further into subdivisions for each of the input functions $f_i$ and each of the output functions $g_i$. When a complex task is performed, the architecture may involve several layers of subdivision. The grouping of different subdivisions into a second level of subdivision also plays a crucial role in the performance of the network. Moreover, there are a variety of embellishments on a simplest subdivided network which include intermediate stages and preselected mappings or feed forward networks. Finally, the training and reward scheme is a non-trivial part of the neural network performance. Optimizing the architecture of the network for a particular task or group of tasks is an important step which can be performed in conjunction with evaluation of the performance of a particular architecture.

Pattern Recognition—Procedure A

I. Identify Input and Output input

Input typically consists of individual frames (still pictures, or other data vector), data stream (sound track) or sequences of frames (movie).

output

Output typically consists of a significantly smaller set of data consisting of binary variables (true/false tests), or more general classification pointers (member of a category or member of a set of several categories or a category identified by a continuous variable, etc.), or a sequence of pointers (sequential pointers to letters forming a sentence). The pointers may be realized in the form of electronic commands to equipment (where there are some set of choices of possible commands) or they may be realized in the form of information displayed or stored for immediate or delayed use.

II. Neural Network Input Receiving Stage (a) Input processing functions

Functions $f_i$ which perform operations on the input data which result in q bits of data containing the ability to distinguish roughly $\alpha q$ distinct representations of possible inputs. Note that the number q of bits is typically larger than the number of distinct representations desired.

(b) Parametrized sets of input processing functions

For optimization, the possible functions may be described as a set of parametrized functions where the parameters can be optimized for a particular application.

(c) Input network architecture

Define regions of neural network for each input function where the simplest case is to identify each function $f_i$ as mapping onto a particular neural subnetwork.

In many applications it is possible to have more than one level of subdivision. In this case the organization or grouping of subnetworks may be essential to performance. This follows since the interconnections between first-level-subnetworks within the same second-level-subnetwork are generically stronger than between first-level-subnetworks in different second-level-subnetworks.

III. Optional Intermediate Stages and Other Features (a) Additional subdivisions The training of a neural network using a reward scheme can enable additional 'hidden' layers of processing to be learned by subnetworks which have no direct connection to input or output stages. Thus it may be beneficial to include additional subnetworks in a given network.

In is here in the additional subnetworks that neurons may be most easily added or removed as part of training.

(b) Intermediate hard-wiring

To promote the development of complex processing operations, it may be beneficial to include 'hard-wired' operations implemented either through feed forward networks or other means in order to promote the involvement of additional neural subdivisions.

(c) Feed forward networks

Feed forward networks trained using back-propagation of error or other means may also be utilized within the network structure. In addition the use of several stages of attractor networks operates in a manner similar to a feed forward network. Back propagation of error may be utilized in the training of such a network, in addition to the usual attractor network training.

(d) Routing neurons

When logical operations involving true/false tests are appropriate 'transistor' synapses may be used. A key example is for the 'routing' of information to particular subnetworks.

IV. Neural Network Output Preparation Stage

The general scheme of the output stage is similar to the input stage with (in the simplest case) the output and input networks attached by interconnection synapses and output functions extracting the output from the state of the output neural network.

(a) Output network architecture

Regions of a neural network are defined for each output function where the simplest case is to identify each function $g_i$ as a function of the state of a particular neural subnetwork.

Like the input, when the output involves more than one level or subdivision the subdivision design is important.

(b) Output processing functions

Functions $g_i$ which perform operations on the state of the output neural network resulting in pointers to the categories etc.

The design of output functions may be optimized by considering the structure of output categories and arranging for similar categories to have shared values for particular subnetworks. The functions $g_i$ map q bits of data onto at most of order $\alpha q$ distinct output categories. Additional processing may be used to map the $\alpha q$ outputs of each $g_i$ onto the desired output categories.

(c) Parametrized categories of output processing functions

For optimization, the possible functions may be described as a set of parametrized functions where the parameters can be optimized for a particular application.

V. Network Operation Procedure

An input/output operation consists of (a) Mapping an input data field onto the input network, (b) Evolving the network according to neuron update rules, The updates may be performed a specified number of times (possibly once) or until a prespecified condition (e.g. stability) is met.

(c) Sampling the output network using the output functions.

VI. Training and Reward Scheme

The reward scheme involves reinforcing desired responses. A generic reward scheme involves a training set of known input/output pairs, a scheme for specifying imprint weights (rewards) for correct answers, a prespecified dissociation sequence and a specification of a training cycle of imprints and dissociation sequence.

(a) Input/output pairs.

A prespecified set of valid input/output pairs is designed. The known input/output pairs serve as a training set. A minimal training set involves one set from each distinct category, however, typically many more are needed. The training procedure is robust to some errors in the validity of input/output pairs.

(b) Imprint weights.

A specification of imprint weights for valid response is made. During training, a valid response to one of the training inputs results in an imprint. The training of the network is made efficient by varying the strength of the imprint based on a variety of criteria.

Early in the training a partially correct or near correct response may receive strong reinforcement while later in the training only more precise responses are reinforced. Determining the proximity of one output response to another is an important procedure which is part of the design of output functions as well as the reward scheme.

Consistently correct responses to a particular category should result in reduced imprint strength since the continued reinforcement is unnecessary and will destabilize other categories and interfere with continued improvement.

In some cases, the strength of imprinting may not be uniform throughout the network. This is one way to enable interconnecting synapses between subnetworks to have smaller weights. Furthermore, varying the strength of imprinting in different domains of the network may enable additional network capabilities such as context sensitive categorization (short term memory).

For 'negative reinforcement' it may be possible to use a negative value of the imprint weight.

(c) Dissociation-sequence.

A neural network dissociation-sequence is specified. The training consists of an sequence of imprints followed by a dissociation sequence. The dissociation-sequence consists of several procedures which typically diminish the strength of synapses, diminish particularly interconnection synapses, and with temporary partial or complete dissociation perform relearning steps consisting of imprints of states evolved from random initial states.

The purpose of the dissociation-sequence is to reduce the total number of recalled imprints, and enlarge the basins of attraction (enhance the stability) of a number of stable states for each subnetwork which is smaller than the overload limit of the sub-network.

For most applications where multiple dissociation sequences are performed the best advantage is achieved by using the same or similar subdivisions for successive dissociation sequences. However, the precise parameters in the procedures such as number of reimprinting steps, degree of synapse modification may vary between dissociation sequences in a prespecified manner which may partially depend on measures of neural network performance.

For single level networks the dissociation-sequence involves only one set of interconnection synapses, while for additional levels, a hierarchy of dissociations are performed involving each level of subdivision.

More specifically, and with reference to FIG. 21, a dissociation sequence 200 for a single level of a neural network may comprise the steps of:

(1) Diminishing the strength of all synapses by a prespecified factor f0

(2) Diminishing the strength of interconnection synapses by a factor f1 (dissociating the network 220).

(3) Performing a relearning step 230 a prespecified number of times where each relearning step comprises the steps of (3.1) Starting the neurons from a random value 250

(3.2) Evolving the neurons by the neuron update rule (at a preselected finite temperature just below the stability point for a preselected number of imprinted memories or using a simulated annealing procedure.) 260

(3.3) Imprinting the resulting neural state with a prespecified strength. 270

(4) Strengthening the strength of interconnection synapses by a factor f2 (reassociating the network). 280

(5) Performing a relearning step (for the reassociated network) a prespecified number of times. 300

For a network subdivided into two levels of subnetworks a dissociation sequence may comprise the steps of:

(1) Performing a dissociation sequence which performs relearning for the smallest subnetworks.

(2) Performing a dissociation sequence which performs relearning for the second level of subnetworks (3) Performing a relearning step for the reassociated network.

(4) Performing a dissociation sequence which performs relearning for the second level of subnetworks (5) Performing a relearning step for the reassociated network.

The parameters which specify the dissociation sequence (f0,f1,f2, the number of relearning steps, the temperature of random state evolution, the sequence of level dissociation) may be varied as the training progresses. In particular the extent of synapse reduction and number of relearning steps may be reduced as the learning progresses and the percentage of correct output values increases.

(d) Training sequence.

Finally, the training sequence is implemented which consists of a number of training sessions comprising:

(1) A number of reward steps 100 comprising (1.1) An input from the training set input onto the network 110

(1.2) Evolution of the network a prespecified number of times or until a stopping criterion is met 120

(1.3) Comparing 140 sampled output 130 with the valid output.

(1.4) Performing an imprint 150 using a strength dependent on the comparison in (1.3)

(2) A dissociation sequence 200

The number of reward steps may be fixed or may be adjustable to be stopped when particular criteria are met. Specifically, tests dependent on the evolution distance of the network before reaching a stable state may be used to determine the proximity to overload of the network, or of subnetworks.

VII. Optimization Scheme

Optimization of the architecture and of various parameters may be performed by a variety of schemes in conjunction with the training and evaluation of performance of one or more examples. Optimization may be performed by a variety of techniques including:

(a) By hand (b) By direct search.

(c) By continuos or quasi-continuous multi-variable improvement (steepest descent, conjugate gradient etc.)

(d) Genetic algorithms.

VIII. Architecture from Network Training and Optimization

After performing network training and optimization one or more architectures for an particular application may be selected. Depending on the desired application, the synapses and network may be convened into a direct mapping of input and output and implemented in a variety of nonadaptive forms. Alternatively an adaptive network may itself be the desired application.

Pattern Recognition—Procedure B

Procedure B for pattern recognition does not use an output network or a reward scheme. Instead it assumes that the input network and input functions are adjusted to provide sufficient category separation in the input network so that the attractors of the input network may be directly mapped onto the output categories. This procedure is likely to be much more difficult than procedure A but may be used in some cases.

The specification of procedure B differs from procedure A only in:

IV. Neural Network Output Preparation Stage (a) Output processing functions

Functions $g_i$ which perform operations on the state of the neural network resulting in pointers to the categories etc.

The functions $g_i$ are selected after a training. The specification of the $g_i$ involves mapping principal basins of attraction of the network onto output categories.

VI. Training Scheme (a) A prespecified set of valid input/output pairs is designed.

The known input/output pairs serve as a training set. A minimal training set involves one set from each distinct category, however, typically many more are needed. The training procedure is robust to some errors in the validity of input/output pairs.

(b) A specification of imprint weights for valid response is determined.

The training of the network is made efficient by varying the strength of the imprint based on a variety of criteria.

The strength of imprinting may be varied by the stability or near stability of a new input sample.

In some cases, the strength of imprinting may not be uniform throughout the network. This is one way to enable interconnecting synapses between subnetworks to have smaller weights. Furthermore, varying the strength of imprinting in different domains of the network may enable additional network capabilities such as context sensitive categorization (short term memory).

(c) A neural network dissociation sequence is implemented with the same description as above.

(d) A training sequence

Finally, the training sequence consists of a number of training sessions comprising:

(1) A number of imprints comprising (1.1) An input from the training set input onto the network (1.2) Performing an imprint using a strength dependent on criteria in (b)

(2) A dissociation sequence

The number of imprints may be fixed or may be adjustable to be stopped when particular criteria are met. Specifically, tests dependent on the evolution distance of the network before reaching a stable state may be used to determine the proximity to overload of the network, or of subnetworks.

Implementation of a particular pattern recognition system, for speech recognition, requires, in addition to the general specification of a pattern recognition task, the description of treatment of time-series in a neural network. There are several approaches to time-series storage in neural networks. For example, one approach uses time delays in synaptic activity. This approach and others may be adopted in the subdivided neural architecture. The approach described below makes use of mapping sequential time intervals onto different parts of the network and shifting the input data each time step.

The description given below assumes a real-time response. By reinterpreting the description of time, it may also be interpreted as a off-line processing system with an internal time.

Well known features of the speech recognition task may be utilized in the design of the neural network and suggest that the approach of a subdivided network is advantageous. Attributes of phonemes such as manner-of-articulation and voicing are attributes which categorize many of the phonemes. By considering a subnetwork as representing an attribute, information both about the nature of desirable input and output functions are derived. Known acoustic correlates of phonetic attributes may be reflected in the selection of specific input functions. Output functions may be explicitly designed to extract phonetic attributes before combining them to identify phonemes and letters. This is analogous to the formation of sounds by neural control in the body. When two different phonemes are formed using a shared physical process (use of tongue, vocal cords, etc.) the neural signals from neural subdivisions are equivalent. When the acoustic correlates and attributes are closely tied input and output processing functions may be expected to be closely linked (synaptic strengths between the specific subnetworks in input and output may be expected to be large).

The use of features in the design of input and output functions suggests commonalty between this approach and the conventional feature-extraction approaches to speech recognition. However, there is a significant difference in the use of information. In the conventional approach, a set of features consisting of binary variables or floating point numbers is extracted from the speech signal to identify explicitly individual phonemes. In contrast, this approach suggests the use of more general remapping of the input information to obtain q data bits, where up to roughly $\alpha q$ distinct categories may be distinguished by this information suggesting a useful redundancy in data. Moreover, the data may be used in conjunction with quite different information about the signal without a need to describe the complete logical connection between the information and the phoneme. Even assuming a small neural network, the effort to describe its logical operation would be substantial. Finally, and significantly, the acoustic correlates of many phonetic attributes are unknown and may be learned from this procedure.

Many speech recognition approaches are based on spectrograms consisting of sequential Fourier transforms of time-series intervals. One example of an input function for a subdivided network is a coarse gained spectrogram extracting 25 bits of data using a 5×5 array of averages over particular frequency-time intervals (e.g. a 5×5 grid from 200 to 2000 Hz [on a linear or log scale] and over 0.2 seconds). Variations in the signal may be enhanced by taking second order differences over intensities in this array. It is important to recognize that the purpose of the data extraction is to obtain no more than 3–4 distinct patterns for these 25 bits. In essence the data provides redundant information to enable the distinction of the patterns. It is well known that some distinctions between phonemes may be distinguished using features which occur over time intervals of order 0.1 seconds, while others occur at time intervals 2 or more orders-of-magnitude smaller. Thus a natural procedure for designing distinct input functions is to target different time scales or frequency intervals with distinct input functions.

Figure 20:
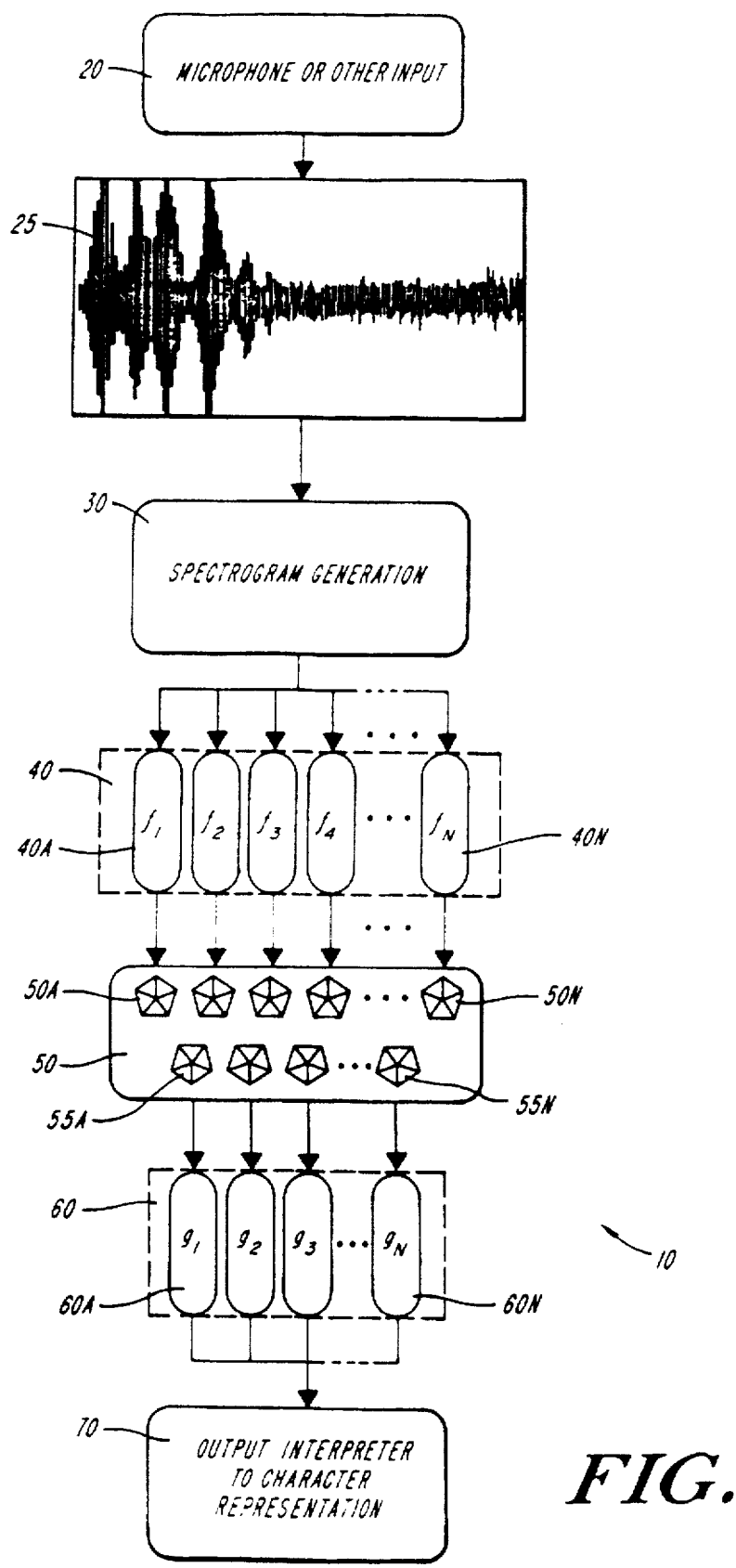
FIG. 20 is a block diagram of a speech recognition apparatus provided by one embodiment of the invention.

Referring to FIG. 20, there is shown the fundamental system components of a speech recognition system 10. An input sound sampling system 20, e.g., a microphone with digitizing hardware as is available on many personal computers and workstations, provides an interface for accepting input sounds. The sampling system 20 produces a digital signal spectrum 25 corresponding to the input sound. A preprocessing stage 30 consists of hardware or software which converts the digital signal into a convenient internal representation such as a spectrogram. This component stage may be incorporated with the next stage. analysis of time-series $f_i$ are applied over one or more time windows. Examples of $f_i$ 40A–40N include hardware or software which performs operations such as:

1. Power integration over specified time interval(s).
2. Power integration over specified time interval(s) and frequency interval(s).
3. Difference(s) between power integration over one specified time and frequency interval and another specified time interval and frequency interval.
4. Second order difference(s) between power integration over different time and frequency intervals. The second order differences may be taken in the time domain, frequency domain or both.
5. Other feature extraction functions as discussed in the literature but typically generalized to provide more than a single bit or single continuous variable output.

Each function $f_i$ has a window of time $w_i$ over which it is applied to the input signal. We use the notation $f_i(t,s)$ to indicate the start-time t and stop-time s of the window of time. Since each function has a well defined window we may also use the notation $f_i(t)$ to indicate only the start time, where the stop time is assumed to be later by the window width. Note that the window may be significantly different for different operations. However, several functions may also have the same window.

A neural network 50 contains subdivisions on which at intervals of time $\tau_0$ the output from $f_i(t_{ij}-n\tau_0)$ 50A–50N are imposed. The notation $f_i(t_{ij}-\tau_0)$ is used to indicate that each function $f_i$ using one-or-more start times $t_{ij}-n\tau_0$ is imprinted on a prespecified region of the network. In the simplest case the network subdivisions coincide with the output region of each function. The network evolves according to conventional neural update rules over the time $\tau_0$.

Output functions $g_i$ implemented as 60A–60D, consisting of hardware or software which samples the state $v_i(\tau-\epsilon)$ of subdivisions 55A–55N of the neural network from just prior to the imposition of an input state and extracts attributes of the phonemes. For example, each output function compares the state of a particular subnetwork with a small number of specified neural states $\{v_i^\alpha\}$. The specified neural states $\{v_i^\alpha\}$ are each identified (through the index $\alpha$) with an attribute of a phoneme. When $v_i(\tau-\epsilon)$ is closely coincident (within a prespecified tolerance) with one of the specified neural states the associated phoneme attribute is passed to the final processing stage 70. Several of the $v_i^\alpha$ may be identified with the same output. It is important to recognize that while the $\{v_i^\alpha\}$ may be adjusted or varied, the basic training procedure assumes that they are prespecified and fixed over the duration of the training. During training the adapting network adjusts its synapses to accommodate the particular selection of $\{v_i^\alpha\}$. The phoneme attributes which may be used include but are not restricted to the conventional phoneme attributes. In comparison with conventional speech recognition approaches it is important to recognize that it is the neural network training procedure which provides the acoustic correlate of a particular phoneme attribute. Thus, particularly in cases where the acoustic correlate of a particular phoneme attribute is not known at present, it may then be extracted from the neural network properties.

In a final processing stage 70 the phoneme attributes are combined in a prespecified manner to generate a phoneme, phoneme group, letter or word 80. Repetition may also be eliminated at this stage when sequential outputs are identical. The stream of data is then output from the speech recognition system to appropriate storage or display apparatus.

This system may also be altered by coupling it with sources of syntactic, lexical or other information implemented using conventional means in post processing, or alternatively, by increasing the complexity of the neural network.

The network synapses within 52 and between 53 the subdivisions 54A–54N, and 55A–55N in the neural network 50 are constructed as follows:

(1) A set of speech samples consisting of neurons 51 are chosen with phoneme samples are chosen with phoneme segments identified (some error may be tolerated).

(2) The speech samples are input into the neural network as described above, and imprinted using a reward scheme (3) The network undergoes a dissociation procedure to define the subdivisions.

(4) (1)–(3) are repeated a prespecified number of times.

Steps (1)–(4) are repeated to optimize the architecture with variations in input-functions, output functions, specified neural states $\{v_i^\alpha\}$, network architecture, and training parameters.

Another very broad class of applications of the subdivision neural network architecture arises from the ability to represent information and its organization in a particular individual or group of individuals or a body of accumulated knowledge. Such systems are often called expert systems. Typically, though not exclusively, a distinction between pattern recognition and expert systems is in the nature of the information. Pattern recognition describes the processing of data fields analogous to visual or auditory processing. Expert systems describes language-based or other high-level information processing tasks. Alternatively, expert systems may be considered as systems which are reflective of the skill of a single individual or small group of individuals in contrast to pattern-recognition considered as a lower level task common to most individuals. For example, the following is a non-inclusive listing of possible expert system applications using the neural network architecture of the invention: decision guidance and advise systems, automatic control systems, medical diagnosis assistance systems, document abstraction systems, sequel writing and composition systems, education program and mental ability diagnostics systems, psychotherapy assistance systems, and professional aptitude evaluation and diagnosis systems.

Most of the expert system applications involve as an essential step transferring to an artificial or engineered device (e.g. computer hardware or software) a representation of the language used by an individual, or the circumstance/response pairs of an individual. Once such a representation has Most of the expert system applications involve as an essential step transferring to an artificial or engineered device (e.g. computer hardware or software) a representation of the language used by an individual, or the circumstance/response pairs of an individual. Once such a representation has been made it is possible to (1) make use of the information in the absence of the individual for similar or novel circumstances, (2) analyze the information to provide guidance to the individual or to others.

The training of an expert system generally follows similar procedures to those for pattern recognition. The exception is that the conventional input/output is often replaced by direct imprint of sequential information—e.g. written or spoken sentences. Thus Procedure B (Direct imprinting rather than reward scheme) may be more readily applicable than Procedure A for such applications. Direct imprinting may be used instead or in conjunction with a reward scheme. Direct imprinting may be used even for the training of a response (input/output) system by including representations of the output in the network imprint.

Quite generally, the use of a neural network for applications requires a coding scheme (preprocessing) of input or input/output pairs so that they can be represented in appropriate form for neural network processing.

The input information may consist of a document or a recording of speech by an individual. Alternatively, the training of the network may be performed interactively with an individual providing real time responses. In either case the information is coded by a preprocessing function and then imprinted on the subdivided network which undergoes a training as described for the case of pattern recognition.

The most straightforward of the expert system applications involves the network reproducing the operation of the individual for the class of inputs for which it is trained. Many applications arise from the diversity of activities and individuals which can be represented.

The application of summarizing a complex document is similar to a classification of documents as a pattern recognition task. The implementation is different, however, since the summary of an individual document results from the key words and relationships extracted from synaptic weights which arise after imprinting the sentences of a single document on a neural network. The input for this application consists of a particular document. Preprocessing for each sentence may consist of known grammatical parsing techniques. Particular parts of the sentence (e.g. nouns verbs and adjectives) are imprinted on subnetworks. Additional contextual information may be included by including partial information from surrounding sentences in the imprinting. The output from the document summary consists of obtaining words and word associations as the fixed points after evolution of random neural starting points. Alternatively a direct analysis of basins of attraction and synaptic weights may be performed. Described in logical form, the result of such an analysis In contrast, treating this as a pattern recognition task on the class of documents would involve imprinting a large number of documents on a neural network and performing a classification operation on a particular document.

Considering another field of application, autism as a disorder, popularized by the movie 'Rain Man', has received significant attention in recent years. It is possible to interpret autism as resulting from a deficiency in the input mappings of the human brain. This deficiency corresponds to the loss of particular sensory information. The information which is useful in distinguishing particular categories of visual or auditory information is not transmitted to later processing stages of the brain. In this way color-blindness is a form of autism which is less of a problem than many other forms of autism because color information is not frequently used for essential functioning tasks.

This model for autism suggests that effective education of autistic individuals should make use of a remapping of information to take advantage of information mappings which are present in the individual. For example, if edge or shape detection is deficient, the individual may learn to read by the use of color to denote letters. Thus, color coding of the 26 letters of the alphabet and a time sequence of colors (flashed on a computer screen) may be learned by an individual who can distinguish colors but not edges.

A detailed understanding of the input deficiencies of a particular individual may be obtained by systematic tests of categorization ability. These may be performed with or without the aid of a computer mapping of the neural architecture.

It may be emphasized that the phenomenon of 'idiot savant' is consistent with this description since the absence of a particular input information generally increases reliance on other information mappings which may be present (and may also not be commonly present in other individuals). Such unusual input mappings lead to well developed abilities in nonstandard areas.

A wide range of other applications are addressed by the neural network architecture and relearning methods of the invention. For example, in the field of data base operations, data may be parsed, merged into prespecified data base formats, formatted or reformatted based on prespecified characteristics, categorized, condensed, summarized, or identified based on various characteristics such as equivalency or incompleteness or errors. In the area of computer graphics or general graphics operations, the network scheme is applicable to image modification, such as justification or smoothing, or pattern fitting and interpolation for image sequences. Further, graphic image descriptions or attribute listings may be generated.

Further applications are directed to the area of natural language. For example, interpretation of human language for computer commands may be facilitated using the neural network scheme. Further interpretation applications include interpreting between different natural languages, and interpreting between different individuals having diverse connotations for given language elements. Further interpretation applications include interpreting between different natural languages, and interpreting between different individuals having diverse connotations for given language elements. Additionally, natural language responses and anticipated statements may be generated for natural language inputs.

Even further applications are within the scope of the invention. For example, in the area of puzzle solving, the neural network scheme is applicable for extracting significant database information, relating information pans, and construction of data field images from pans originally in disparate locations. Other diverse applications are also within the scope of the neural network scheme.

What is claimed is:

1. Neural network apparatus for processing input information for a prespecified application to indicate one output category from a set of prespecified output categories for said prespecified application in response to said input information, the input information being supplied to said apparatus as a data array, the neural network apparatus comprising:

an input stage for accepting said data array and converting said data array to a corresponding internal representation;

a data preprocessor connected to said input stage for analyzing said data array based on a plurality of distinct feature attributes to generate a corresponding plurality of attribute measures;

a neural network comprising a plurality of interconnected neurons, said neural network divided into portions, each of said portions being predefined to include a number of said interconnected neurons and said portions being interconnected and exercising a mutual influence, each portion of a first subset of said portions being prespecified with a particular correspondence to one of said feature attributes and adapted to accept from said data preprocessor one of said attribute measures for said data array, said neural network processing said plurality of attribute measures to reach a neural state representative of category attributes, each portion of a second subset of said portions being prespecified with a particular correspondence to one of said category attributes;

a data postprocessor connected to said neural network for obtaining category attribute indicators for said category attributes by correlating said neural state with predefined category attribute measures; and an output stage for accepting said category attribute indicators and combining said category attribute indicators in a prespecified manner to generate said output category for said input information.

2. The neural network apparatus of claim 1 wherein said internal representation is a binary representation.

3. The neural network apparatus of claim 1 wherein said internal representation is an analog representation.

4. The neural network apparatus of claim 1 wherein said neural network is an attractor neural network.

5. The neural network apparatus of claim 1 wherein said neural network further comprises a third subset of portions, each of said third subset of portions not being prespecified with a correspondence to one of said feature attributes or one of said category attributes.

6. The neural network apparatus of claim 1 wherein said portions of said neural network comprise a prespecified hierarchy of subdivided portions each including a prespecified number of said neurons.

7. The neural network apparatus of claim 1 wherein said neurons are interconnected via synapses, each synapse characterized by an interconnection weight, and wherein said synapses interconnecting neurons in different portions maintain interconnection weights which are characteristically smaller than interconnection weights maintained by said synapses interconnecting neurons in the same portion.

8. The neural network apparatus of claim 1 wherein said neurons within a first of said portions are interconnected by $S_N$ synapses and where said neurons within a first of said portions are connected to neurons outside of said first of said portions by S synapses, and wherein S is no greater than $S_N$.

9. The neural network apparatus of claim 1 wherein said input information comprises sensory input information.

10. The neural network apparatus of claim 1 wherein:

said plurality of neurons are interconnected by synapses which are each characterized by an interconnection weight; and said neural network has been trained by a method comprising the steps of:

adjusting said interconnection weights a prespecified number of times each comprising the steps of:

inputting to said network one of a plurality of prespecified training inputs for processing by said network for a predefined processing interval to produce an output at the end of said processing interval, each training input being associated with a corresponding prespecified training output, sampling said output of said network at the end of said processing interval and comparing said output with said corresponding prespecified training output, and based on said comparison, imprinting corresponding connection weights on said interconnections; and performing a dissociation sequence, comprising the steps of:

decreasing said interconnection weights of a prespecified set of said synapses by a first prespecified factor, performing a first relearning procedure a first prespecified number of times each comprising the steps of:
  initiating said network to a random neural state,
  evolving said neural network from said random neural state to a resulting neural state based on a prespecified update role at a first preselected finite temperature below a point of stability for a first preselected number of imprinted memories, and
  imprinting said synapses with interconnection weights corresponding to said resulting neural state, increasing said interconnection weights of said prespecified set of synapses by a second prespecified factor, and performing a second relearning procedure on said network a second prespecified number of times each comprising the steps of:
  initiating said network to a random neural state,
  evolving said neural network from said random neural state to a resulting neural state based on a second prespecified update rule at a second preselected finite temperature below a point of stability for a second preselected number of imprinted memories, and
  imprinting said synapses with interconnection weights corresponding to said resulting neural state, whereby said neural network is trained for said prespecified application.

11. The neural network apparatus of claim 10 wherein said first and second prespecified factors are each synapse-dependent.

12. The neural network apparatus of claim 11 wherein said neural network has been trained a prespecified number of times, and wherein said first and second prespecified factors are constant with each said repetition.

13. The neural network apparatus of claim 10 wherein said prespecified training inputs and outputs correspond to visual patterns.

14. The neural network apparatus of claim 10 wherein said prespecified training inputs and outputs correspond to acoustic patterns.

15. The neural network apparatus of claim 10 wherein said prespecified training inputs and outputs correspond to a body of knowledge relating to a particular field of expertise.

16. The neural network apparatus of claim 1 wherein said plurality of neurons interconnected by synapses which are each characterized by an interconnection weight, said neural network having previously reached a predefined capacity for information storage, and subsequently been trained by a method comprising the steps of:
  performing a dissociation sequence, comprising the steps of:
    decreasing said interconnection weights by a first prespecified factor to dissociate said network,
  performing a first relearning sequence a first prespecified number of times each comprising the steps of:
    initiating said network to a random neural state,
    evolving said neural network from said random neural state to a resulting neural state based on a prespecified update rule at a first preselected finite temperature below a point of stability for a first preselected number of imprinted memories, and
    imprinting said synapses with interconnection weights corresponding to said resulting neural state,
  increasing said interconnection weights by a second prespecified factor to reassociate said network, and
  performing a second relearning sequence a second prespecified number of times each comprising the steps of:
    initiating said network to a random neural state,
    evolving said neural network from said random neural state to a resulting neural state based on a prespecified update rule at a second preselected finite temperature below a point of stability for a second preselected number of imprinted memories, and
  imprinting said interconnections with interconnection weights corresponding to said resulting neural state, whereby further information may be imprinted on the network, so that said neural network has achieved additional capacity for information imprinting.

17. The neural network apparatus of claim 1, wherein:

said neural network having previously reached a predefined capacity for information storage, and subsequently been trained by a method comprising the steps of:
  initiating said network to a random neural state,
  evolving said neural network from said random neural state to a resulting neural state based on a prespecified update rule at a preselected finite temperature below a point of stability for a preselected number of imprint memories, and
  imprinting said synapses with interconnection weights corresponding to said resulting neural state, whereby further information may be imprinted on the network, so that said neural network has achieved additional capacity for information imprinting 18. The neural network apparatus of claim 1 wherein said input information is a speech pattern and said data array comprises digitized time samples of said speech information;

said input stage comprises a signal preprocessor;

said data preprocessor is a signal feature processor adapted to apply a plurality of signal attribute functions to said internal representation of said data array at prespecified time intervals;

said attribute measures comprise acoustic attribute measures;

said category attributes comprise phoneme category attributes;

said category attribute measures comprise phoneme category attributes measures; and said output category comprises a speech pattern category output.

19. The neural network apparatus of claim 18 wherein said speech pattern category output comprises a phoneme.

20. The neural network apparatus of claim 18 wherein said speech pattern category output comprises a letter.

21. The neural network apparatus of claim 18 wherein said speech pattern category output comprises a word.

22. The neural network apparatus of claim 21 wherein said internal representation comprises a signal spectrogram.

23. The network apparatus of claim 22 wherein said signal attribute functions comprise a measure of signal power integrated over a prespecified time and frequency interval.

24. The neural network apparatus of claim 1 wherein said output categories are representative of characteristic responses to said input information based on a specific preselected body of knowledge relating to a field of expertise previously presented to said neural network.

25. The neural network apparatus of claim 18 wherein said sound system comprises a microphone and hardware for digitizing sounds sensed by said microphone.

26. The neural network apparatus of claim 25 further comprising storage apparatus for recording said speech pattern category output.

27. The neural network apparatus of claim 25 further comprising display apparatus for displaying said speech pattern category output.

28. The neural network apparatus of claim 1 wherein:
said plurality of neurons are interconnected by synapses which are each characterized by an interconnection weight; and
said neural network has been trained by a method comprising the steps of:
adjusting said synapse interconnection weights a prespecified number of times each comprising the steps of:
inputting to said network one of a plurality of prespecified training inputs for processing by said network for a predefined processing interval to produce an output at the end of said processing interval, each training input being associated with a corresponding prespecified training output,
sampling said output of said network at the end of said processing interval and comparing said output with said corresponding prespecified training output, and
based on said comparison, imprinting corresponding connection weights on said interconnections; and
performing a dissociation sequence, comprising the steps of:
decreasing said synapse interconnection weights of a prespecified number of synapses by a first prespecified factor to dissociate said network,
performing a first relearning procedure a first prespecified number of times each comprising the steps of:
initiating said network to a random neural state,
evolving said neural network from said random neural state to a resulting neural state based on a prespecified update rule at a first preselected finite temperature below a point of stability for a first preselected number of imprinted memories, and
imprinting said synapses with interconnection weights corresponding to said resulting neural state,
increasing said interconnection weights of said prespecified number of synapses by a second prespecified factor to reassociate said network, and
performing a second relearning procedure on said reassociated network a second prespecified number of times each comprising the steps of:
initiating said network to a random neural state,
evolving said neural network from said random neural state to a resulting neural state based on a prespecified update role at a second preselected finite temperature below a point of stability for a second preselected number of imprinted memories, and
imprinting said synapses with interconnection weights corresponding to said resulting neural state, whereby said neural network is trained for said prespecified application.

29. The neural network apparatus of claim 28 wherein said neural network comprises portions which are each predefined with a number of said neurons, and wherein said dissociation sequence further comprises applying said steps of interconnection weight decreasing, relearning, and interconnection weight increasing for each portion of said network.

30. The neural network apparatus of claim 29 wherein each of said neural network portions comprises a hierarchy of subdivisions each predefined with a number of said neurons, and wherein said dissociation sequence further comprises applying said steps of interconnection weight decreasing, relearning, and interconnection weight increasing for each subdivision of said hierarchy of subdivisions.

31. The neural network apparatus of claim 28 wherein said dissociation sequence further comprises the steps of adding and removing selected neurons based on indications of local and global activity, using a biased statistical procedure.

32. The neural network apparatus of claim 1 wherein each portion of said first subset of portions is capable of distinguishing between one set of a first series of sets of attribute measures, the size of said one set of said first series of sets being proportional by a proportionality constant to the number of neurons in said portion of said first subset of portions, where said proportionality constant is approximately 0.15, and
wherein each portion of said second subset of portions being capable of distinguishing between one set of a second series of sets of attribute measures, the size of said one set of said second series of sets being proportional by a proportionality constant to the number of neurons in said portion of said second subset of portions, where said proportionality constant is approximately 0–15.

33. Computer apparatus for processing input information for a prespecified application to indicate one output category from a set of prespecified output categories for said prespecified application in response to said input information, the input information being supplied to said apparatus as a data array, the computer apparatus comprising:
an input stage for accepting said data array and converting said data array to a corresponding internal representation;
a data preprocessor connected to said input stage for analyzing said data array based on a plurality of distinct feature attributes to generate a corresponding plurality of attribute measures;
a plurality of interconnected processors, said processors being interconnected and exercising a mutual influence each processor of a first subset of said processors being prespecified with a particular correspondence to one of said feature attributes and adapted to accept from said data preprocessor one of said attribute measures for said data array, said interconnected processors processing said plurality of attribute measures to generate a result representative of category attributes, each processor of a second subset of said processors being prespecified with a particular correspondence to one of said category attributes;
a data postprocessor to said plurality of processors for obtaining category attribute indicators for said category attributes by correlating said result with predefined category attribute measures; and an output stage for accepting said category attribute indicators and combining said category attribute indicators in a prespecified manner to generate said output category for said input information.

34. Neural network apparatus for pattern recognition by categorization of an input pattern by indicating one output category from a set of prespecified output categories in response to said input pattern, said input pattern being supplied to the apparatus as a data stream corresponding to an input pattern field, said neural network apparatus comprising:

an input stage for accepting said input pattern and converting said data stream to a corresponding internal representation;

a data preprocessor connected to said input stage for analyzing said data stream based on a plurality of distinct pattern attributes to generate a corresponding plurality of attribute measures;

a neural network comprising a plurality of interconnected neurons, said neural network divided into portions, each of said portions being predefined to include a number of said interconnected neurons and said portions being interconnected and exercising a mutual influence, each portion of a first subset of said portions being prespecified with a particular correspondence to one of said pattern attributes and adapted to accept from said data preprocessor one of said attribute measures for said input pattern, said neural network processing said attribute measures to reach a neural state representative of pattern category attributes, each portion of a second subset of said portions being prespecified with a particular correspondence to said category attributes;

a data postprocessor connected to said neural network for obtaining category attribute indicators for said category attributes by correlating said neural state with predefined pattern category attribute measures; and an output stage for accepting said pattern category attribute indicators from said postprocessor and combining said pattern category attribute indicators in a prespecified manner to generate said output category for said input pattern.

* * * * *

UNITED STATES PATENT AND TRADEMARK OFFICE
CERTIFICATE OF CORRECTION

PATENT NO. : 5,687,286
DATED : November 11, 1997
INVENTOR(S) : Yaneer Bar-Yam

It is certified that error appears in the above-indentified patent and that said Letters Patent is hereby corrected as shown below:

Column 1, line 55: please delete "pan"; and insert therefor --part--.

Column 3, line 18: please delete "trig"; and insert therefor --training--.

Column 6, line 55: please delete "pan"; and insert therefor --part--.

Column 10, line 1: please delete "$\{V_a^\alpha\}$"; and insert therefor --$\{V_i^\alpha\}$--.

Column 10, line 27: please delete "stab"; and insert therefor --state--.

Column 10, line 32: please delete "pan"; and insert therefor --part--.

Column 10, line 39: please delete "pan"; and insert therefor --part--.

Column 14, line 53: please delete "storm"; and insert therefor --stored--.

Column 21, line 19: please delete "pan"; and insert therefor --part--.

Column 24, line 39: please delete "$\{W_i^\alpha\}$"; and insert therefor --$\{W_i^\beta\}$--.

Column 26, line 37: please delete "$\beta=30.035$"; and insert therefor --$\beta=0.035$--.

UNITED STATES PATENT AND TRADEMARK OFFICE
CERTIFICATE OF CORRECTION

PATENT NO. : 5,687,286
DATED : November 11, 1997
INVENTOR(S) : Yaneer Bar-Yam

It is certified that error appears in the above-indentified patent and that said Letters Patent is hereby corrected as shown below:

Column 26, line 39: please delete "dose"; and insert therefor --close--.

Column 26, line 41: please delete "8imprinted"; and insert therefor --8 imprinted--.

Column 28, line 20: please delete "$\{W_i^{\alpha,r}\}$"; and insert therefor --$\{W_i^{\beta,r}\}$--.

Column 29, line 36: please delete "pan"; and insert therefor --part--.

Column 30, line 27: please delete "Hem," and insert therefor --Here--.

Column 35, line 60: please delete "convened" and insert therefor --converted--.

Column 39, line 14: please insert --50A-50N,--; after "subdivisions" therefor.

Column 39, line 15: please insert --consisting of neurons 51--; after "50" therefor.

UNITED STATES PATENT AND TRADEMARK OFFICE
CERTIFICATE OF CORRECTION

PATENT NO. : 5,687,286
DATED : November 11, 1997
INVENTOR(S) : Yaneer Bar-Yam

It is certified that error appears in the above-indentified patent and that said Letters Patent is hereby corrected as shown below:

Column 39, line 16: please delete "consisting of neurons 51" therefor.

Column 41, line 43: please delete "pans"; and insert therefor --parts--.

Column 41, line 44: please delete "pans"; and insert therefor --parts--.

Signed and Sealed this

Twenty-fifth Day of August, 1998

Attest:

BRUCE LEHMAN

Attesting Officer

Commissioner of Patents and Trademarks